US012104437B2

(12) United States Patent
Blair et al.

(10) Patent No.: US 12,104,437 B2
(45) **Date of Patent: *Oct. 1, 2024**

(54) WINDOW TREATMENT HEMBAR

(71) Applicant: Lutron Technology Company LLC, Coopersburg, PA (US)

(72) Inventors: Edward J. Blair, Telford, PA (US); David A. Kirby, Zionsville, PA (US); Vladislav Pejic, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,980

(22) Filed: Dec. 21, 2021

(65) Prior Publication Data

US 2022/0112765 A1 Apr. 14, 2022

Related U.S. Application Data

(63) Continuation of application No. 15/964,274, filed on Apr. 27, 2018, now Pat. No. 11,215,008.
(Continued)

(51) Int. Cl.
*E06B 9/42* (2006.01)
*A47H 23/01* (2006.01)
(Continued)

(52) U.S. Cl.
CPC ............... *E06B 9/42* (2013.01); *A47H 23/01* (2013.01); *E06B 9/17046* (2013.01); *E06B 9/388* (2013.01)

(58) Field of Classification Search
CPC ........ E06B 9/322; E06B 9/42; E06B 9/17046; E06B 9/388; E06B 9/40; E06B 9/26;
(Continued)

(56) References Cited

U.S. PATENT DOCUMENTS 794,947 A 7/1905 Orr
955,607 A 4/1910 Randolph
(Continued)

FOREIGN PATENT DOCUMENTS

CN 2887188 Y 4/2007
CN 201365023 Y 12/2009
(Continued)

OTHER PUBLICATIONS

Mase; JP 60 34290 Translation; 1985 (Year: 1985).*
(Continued)

*Primary Examiner* — Abe Massad
(74) *Attorney, Agent, or Firm* — Flaster Greenberg, P.C.

(57) ABSTRACT

A hembar may define a front portion and a rear portion configured to slidably engage each other. The front portion and the rear portion, when slidably engaged, may define a slot configured to receive a piece of fabric. The front portion and the rear portion may be configured to clamp the piece of fabric within the slot. The front portion and the rear portion may be configured such that a width of the slot is adjustable. The front portion may define a first attachment surface and the rear portion may define a second attachment surface. The first attachment surface may define a rib. The second attachment surface may define a groove configured to receive the rib when the front portion is slidably engaged with the rear portion such that the piece of fabric is clamped within the slot.

21 Claims, 15 Drawing Sheets

Related U.S. Application Data

(60) Provisional application No. 62/553,458, filed on Sep. 1, 2017, provisional application No. 62/491,807, filed on Apr. 28, 2017.

(51) Int. Cl.
*E06B 9/17* (2006.01)
*E06B 9/388* (2006.01)

(58) Field of Classification Search
CPC ......... E06B 9/262; A47H 23/00; A47H 23/01; G09F 15/0018; G09F 15/0025
See application file for complete search history.

(56) References Cited

U.S. PATENT DOCUMENTS

| | | | | |
|---|---|---|---|---|
| 1,068,498 | A | 7/1913 | Harding | |
| 1,782,905 | A | 11/1930 | Mohun et al. | |
| 2,784,782 | A | 3/1957 | Young | |
| 3,553,862 | A | 1/1971 | Hamu | |
| 3,833,046 | A | 9/1974 | Tombu | |
| 3,885,335 | A | 5/1975 | Egermayer | |
| 3,961,661 | A | 6/1976 | Tombu | |
| 4,041,861 | A | 8/1977 | Alter | |
| 4,053,008 | A | 10/1977 | Baslow | |
| 4,153,981 | A | 5/1979 | Stuppy | |
| 4,498,255 | A | 2/1985 | Heard | |
| 4,539,734 | A | 9/1985 | Messerschmitt | |
| 4,682,642 | A | 7/1987 | Hogshead et al. | |
| 4,694,543 | A | 9/1987 | Conley | |
| 4,899,797 | A | 2/1990 | Green | |
| 5,203,055 | A * | 4/1993 | Broadwater, Sr. | B60J 7/104 160/369 |
| 5,209,029 | A * | 5/1993 | Foerst | F16B 5/0692 52/63 |
| 5,224,306 | A * | 7/1993 | Cramer | E04H 5/02 52/63 |
| 5,307,575 | A | 5/1994 | Ivansson et al. | |
| 5,320,154 | A | 6/1994 | Colson et al. | |
| 5,815,971 | A | 10/1998 | Rothe et al. | |
| 5,819,836 | A | 10/1998 | Keil | |
| 6,357,507 | B1 | 3/2002 | Stoebich et al. | |
| 6,412,537 | B1 | 7/2002 | Voss et al. | |
| 6,491,084 | B2 * | 12/2002 | Voss | E06B 9/322 160/84.05 |
| 6,769,471 | B2 | 8/2004 | Voss et al. | |
| 6,789,978 | B1 | 9/2004 | Yoshinari | |
| 6,876,493 | B1 | 4/2005 | Lin | |
| 8,196,325 | B2 | 6/2012 | Pitcher et al. | |
| 8,763,215 | B1 | 7/2014 | Lin | |
| 9,348,206 | B2 | 5/2016 | Matsubara | |
| 9,770,578 | B2 | 9/2017 | Chowdhury | |
| 10,227,816 | B2 | 3/2019 | Kim | |
| 11,215,008 | B2 | 1/2022 | Blair et al. | |
| 2005/0224191 | A1 | 10/2005 | Nien | |
| 2009/0078548 | A1 | 3/2009 | Neeraj et al. | |
| 2012/0061034 | A1 | 3/2012 | Ng | |
| 2012/0292174 | A1 | 11/2012 | Mah et al. | |

FOREIGN PATENT DOCUMENTS

| | | | |
|---|---|---|---|
| CN | 103429837 | A | 12/2013 |
| CN | 203762828 | U | 8/2014 |
| CN | 208885166 | U | 5/2019 |
| DE | 3239319.9 | C2 | 8/1992 |
| DE | 10052241 | A1 | 4/2002 |
| EP | 0494501 | A2 | 7/1992 |
| EP | 1063385 | A2 | 12/2000 |
| GB | 2381819 | A | 5/2003 |
| JP | S6019891 | A | 2/1985 |
| JP | S6034290 | U | 3/1985 |
| WO | 2018200895 | A1 | 11/2018 |

OTHER PUBLICATIONS

JPS 60-34290 Machine translation, 1985; retrieved from https://worldwide.espacenet.com/publicationDetails/biblio?CC=JP&NR=S6034290U&KC=U&FT=D&ND=5&date=19850308&DB=&locale=en_EP (Year: 1985), 1985, 1 page.

Mace, Ryoichi, JPS 60-34290 Machine translation, 1985; retrieved from https://worldwide.espacenet.com/publicationDetails/biblio?CC=JP&NR=S6034290U&KC=U&FT=D&ND=5&date=19850308&DB=&locale=en_EP (Year: 1985), 1985, 9 pages.

* cited by examiner

WINDOW TREATMENT HEMBAR

CROSS-REFERENCE TO RELATED APPLICATIONS

This application is a continuation of U.S. Non-Provisional patent application Ser. No. 15/964,274, filed Apr. 27, 2018, which claims priority from: U.S. Provisional Patent Application No. 62/491,807, filed Apr. 28, 2017 and U.S. Provisional Patent Application No. 62/553,458, filed Sep. 1, 2017, the contents of which are incorporated by reference.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows over which the roller shade is mounted.

A typical hembar may weigh the lower end of the shade fabric to limit wrinkling of the shade fabric and to facilitate smooth operation of the roller shade as the shade fabric is wound and unwound from the roller tube. A typical hembar may use one or more of a variety of attachment means to secure a shade fabric to the hembar, including the use of adhesives and staples.

A typical hembar has a height that is greater than its depth. For example, the height of a typical hembar may be determined such that the shade fabric can be adequately secured, while the depth is minimized to save on manufacturing and material costs.

SUMMARY

As described herein, a window treatment system may include a roller tube, a flexible material, and/or a hembar. The hembar may have a height and a depth, where the depth may be greater than the height. The flexible material may be a piece of fabric and may be windingly attached to the roller tube. The flexible material may be operable between a raised position and a lowered position via rotation of the roller tube. The hembar may be configured to engage a lower end of the flexible material.

When the flexible material is in the raised position, the hembar may be configured to fit into a space below the flexible material wrapped around the roller tube and above a bottom plane tangential to a bottom of the flexible material wrapped around the roller tube. The space in which the hembar is stored when the flexible material is in the raised position may be further bounded by a structure (e.g., a wall) to which a mounting bracket of the window treatment system is mounted. A front half portion of the hembar may be configured to be stored, when the flexible material is in the raised position, within a space defined by the flexible material on the roller tube, the bottom plane, and a rear plane that extends through the flexible material hanging above the hembar. The hembar may define a front portion having an tapper surface with a sloped profile that allows the hembar to fit in the space below the flexible material wrapped around the roller tube and above the bottom plane when the flexible material is in the raised position.

A hembar may have a front wall that defines a substantially vertical front surface. The hembar may have a rear wall that defines a substantially vertical rear surface. The front wall and the rear wall may be spaced from each other by a horizontal distance. The hembar may have a bottom wall that defines a substantially horizontal bottom surface. The hembar may have a slot located between the front wall and the rear wall. The slot may be configured to receive a flexible material. The hembar may be configured to clamp the flexible material within the slot. The slot may extend along the length of the hembar. The slot may be located at a point (e.g., a midpoint) between the front wall and the rear wall.

The hembar may be a single piece. A single piece hembar may be configured to deform such that the flexible material can be received and clamped within the slot. The hembar may define a vertical distance from an opening of the slot to the bottom wall. The horizontal distance may be greater than the vertical distance.

The hembar may include two or more pieces that slidably attach to one another. A first piece may include the front wall and a second piece may include the rear wall. The hembar may include a rubber spline that is elongate within a channel defined by the first piece and the second piece. The rubber spline may be configured to exert a force on the first piece and the second piece such that the flexible material is clamped within the slot. The hembar may define a center of gravity that is aligned with the slot.

A hembar may define a front portion and a rear portion. The front portion and the rear portion may be elongate along a longitudinal axis of the roller tube. The rear portion may be configured to slidably engage the front portion. The front portion and the rear portion, when slidably engaged, may define a slot configured to receive a piece of fabric. The front portion and the rear portion may be configured to clamp the piece of fabric within the slot. The front portion and the rear portion may be configured such that a width of the slot is adjustable. For example, the width of the slot may be continuously variable from a first width to a second width. The front portion may define a first attachment surface and the rear portion may define a second attachment surface. The first attachment surface may define a rib. The second attachment surface may define a groove configured to receive the rib when the front portion is slidably engaged with the rear portion. The rib and groove may be configured to clamp the piece of fabric within the slot.

A flexible material may be attached to a hembar by securing the flexible material to a first attachment surface on a rear portion of the hembar. For example, the flexible material may be attached to the first attachment surface using double-sided tape (e.g., tape with adhesive on both sides). A tensile force may be applied to opposed ends of a rubber spline such that the rubber spline is stretched from a first length to a second length and from a first diameter to a second diameter. The rubber spline may be inserted within a cavity defined by the rear portion while the tensile force is applied to the rubber spline. The rubber spline may be elongate along the hembar and may have a first diameter. A front portion of the hembar may be slid into engagement with the rear portion from a first end of the rear portion to a second end of the read portion. The tensile force may be removed from the opposed ends of the rubber spline such that the rubber spline expands within the cavity to a third diameter. The third diameter may be less than the first diameter and greater than the second diameter. The rubber spline may exert a force on the front portion and the rear portion such that the flexible material is clamped within the slot.

As further described herein, a hembar for attachment to an end of a flexible material may have a body defining a recess configured to receive the end of the flexible material through a gap in the body, and a spline received within the recess and configured to clamp the flexible material against an inner surface of the recess. The body may define a planar vertical surface configured such that the flexible material may be arranged adjacent to the planar vertical surface after exiting the recess. The planar vertical surface may have an adhesive for attaching the flexible material to the planar vertical surface. The end of the flexible material may be wound around and may be attached to the spline inside the recess.

A hembar may include a first portion and a second portion. The second portion may be configured to slidably engage the first portion. The first portion and the second portion may define a slot that may be configured to receive a piece of fabric. The first portion and the second portion may be configured such that a width of the slot is adjustable. For example, the width of the slot may be variable (e.g., continuously variable) from a first width to a second width. The first portion and the second portion may be configured to clamp the piece of fabric within the slot. The piece of fabric may be attached to the first portion or the second portion within the slot, for example, using double-sided tape. The first portion may define a first attachment surface. The second portion may define a second attachment surface. The first attachment surface may be configured to press against the second attachment surface when the first portion is slidably engaged with the second portion. The hembar may include a compressible member. The compressible member may be a hollow rubber spline. The compressible member may exert a force on the first portion and the second portion such that the piece of fabric is clamped between the first attachment surface and the second attachment surface.

The first attachment surface may define a rib. The second attachment surface may define a groove. The groove may be configured to receive the rib when the first portion is slidably engaged with the second portion. The rib and the groove may be configured to clamp the piece of fabric within the slot. The first portion and the second portion may be pushed together in response to tightening of a fastener. For example, the first portion and the second portion may be pulled together by one or more fasteners. The first portion may include a body. The second portion may include a clamping portion. The first portion may define a first flange and a first channel. The second portion may define a second flange and a second channel. The first flange may be received within the second channel and the second flange may be received within the first channel such that alignment is maintained between the first portion and the second portion. The first portion and the second portion may be locked together by a plurality of snaps.

A hembar may include a front wall, a rear wall, a bottom wall, and a slot. The front wall may define a substantially vertical front surface. The rear wall may define a substantially vertical rear surface. The front wall and the rear wall may be spaced from each other by a horizontal distance. The bottom wall may define a substantially horizontal bottom surface. The slot may be located between the front wall and the rear wall. The hembar may define a center of gravity that may be aligned with the slot. For example, a weight of the hembar may be divided substantially equally on either side of the slot. The slot may extend along a length of the hembar. The slot may be located at point (e.g., a midpoint) between the front wall and the rear wall. The slot may be configured to receive a flexible material. The hembar may be configured to clamp the flexible material within the slot. The hembar may define a vertical distance from an opening of the slot to the bottom wall. The horizontal distance may be greater than the vertical distance. A depth of the hembar may be at least two times a height of the hembar.

The hembar may include two or more pieces that slidably attach to one another. A first piece of the two or more pieces may include the front wall. A second piece of the two or more pieces may include the rear wall. The hembar may include a rubber spline. The rubber spline may be elongate within an opening defined by the first piece and the second piece. The rubber spline may be configured to exert a force on the first piece and the second piece, for example, such that the flexible material is clamped within the slot. The hembar may include a single piece. The hembar may be configured to deform such that the flexible material is received and clamped within the slot.

A window treatment system may include a roller tube, a flexible material, and a hembar. The roller tube may have a longitudinal axis. The flexible material may be attached to the roller tube. The flexible material may be operable between a raised position and a lowered position via rotation of the roller tube. The hembar may be configured to engage a lower end of the flexible material. The hembar may have a height and a depth that may be greater than the height. When the flexible material is in the raised position, the hembar may be configured to fit into a space below the flexible material wrapped around the roller tube and above a bottom plane tangential to a bottom of the flexible material wrapped around the roller tube.

The hembar may include a body having a front wall and a rear wall. The front wall may define a substantially vertical front surface. The rear wall may define a substantially vertical rear surface. The front wall and the rear wall may be spaced from each other by a horizontal distance. The body may have a bottom wall that may define a substantially horizontal bottom surface. The body may define a slot located between the front wall and the rear wall. The slot may be configured to receive the flexible material. The body of the hembar may define a vertical distance from an opening of the slot to the bottom wall. The horizontal distance may be greater than the vertical distance. The hembar may include a spline (e.g., a wedge-shaped spline) around which an end portion of the flexible material may be wrapped. The spline may be configured to be received within the slot between the body of the hembar and the spline. The flexible material may exit the hembar through the slot. The spline may be captured in a recess formed in the body of the hembar. The flexible material may exit the hembar through the slot without the slot clamping the flexible material. An interior member may capture an end portion of the flexible material. The interior member may be located in a recess formed in the body of the hembar. The body of the hembar may be configured to rotate about the interior member such that the body of the hembar hangs substantially level in a radial direction. The body may be characterized by a center of gravity that is aligned with the slot. The slot may be located at a point (e.g., a midpoint) between the front wall and the rear wall. A weight of the hembar may be divided substantially equally on either side of the slot. A depth of the hembar may be at least two times a height of the hembar. The hembar may include a first piece and a second piece. The first piece may include the front wall and the second piece may include the rear wall. The first and second pieces may slidably attach to one another. The hembar may include a spline (e.g., a rubber spline) that may be elongate within an opening defined be the first piece and the second piece. The spline may be configured to exert a force on the first piece and the second piece such that the flexible material is clamped within the slot. The hembar may include a single piece. The hembar may be configured to deform such that the flexible material is received and clamped within the slot. The slot may be formed between a first surface of the body and a second surface of the body. The flexible material may be planar along at least one of the first surface or the second surface, for example, in the slot before exiting the body. The hembar may be configured to clamp the flexible material within the slot. The slot may be located between the front wall and the rear wall. The space in which the hembar is stored when the flexible material is in the raised position is further bounded by a structure to which a mounting bracket of the window treatment system is mounted. When the flexible material is in the raised position, a front half portion of the hembar may be configured to be stored within a space defined by the flexible material on the roller tube, the bottom plane, and a rear plane that extends through the flexible material hanging above the hembar. The hembar may define a front portion having an upper surface with a sloped profile that may allow the hembar to fit in the space below the flexible material wrapped around the roller tube and above the bottom plane when the flexible material is in the raised position.

A hembar may include a body having a first surface and a second surface that may define a slot. The slot may be configured to receive a flexible material. The body may have a center of gravity that is aligned with the slot. The first surface may be a substantially vertical surface. When the flexible material is received in the slot, the flexible material may be arranged to be planar along the first surface before exiting the body. The body may have a front wall and a rear wall. The front wall may define a substantially vertical front surface. The rear wall may define a substantially vertical rear surface. The front wall and the rear wall may be spaced from each other by a horizontal distance. The body may have a bottom wall that may define a substantially horizontal bottom surface. The body may define a slot that may be located between the front wall and the rear wall. The slot may be configured to receive the flexible material. The body of the hembar may define a vertical distance from an opening of the slot to the bottom wall. The horizontal distance may be greater than the vertical distance. The hembar may include a spline around with an end portion of the flexible material may be wrapped. The spline may be configured to be received within a recess formed in the body of the hembar. The flexible material may exit the hembar through the slot. The spline may be configured to be received in the slot such that the flexible material may be clamped within the slot between the body of the hembar and the spline. The spline may be characterized by a wedge shape having a thin end and a thick end. The wedge shape of the spline may substantially correspond to a shape of the slot in the body. The slot may receive the flexible material without clamping the flexible material. The spline may be captured in the recess. The end portion of the flexible material may be attached to an outer surface of the spline. The slot may be located at a point (e.g., a midpoint) between the front wall and the rear wall. A depth of the hembar may be at least two times a height of the hembar. The hembar may be configured to clamp the flexible material within the slot. The body may include a first piece that includes the front wall and a second piece that includes the rear wall. The first and second pieces may slidably attach to one another. The hembar may include a spine (e.g., a rubber spline) that may be elongate within an opening defined by the first piece and the second piece. The spline may be configured to exert a force on the first piece and the second piece such that the flexible material is clamped within the slot. The body may include a single piece. The body may be configured to deform such that the flexible material may be received and clamped within the slot. A weight of the hembar may be divided substantially equally on either side of the slot.

A hembar may include a body having a front wall defining a substantially vertical front surface and a rear wall defining a substantially vertical rear surface. The front wall and the rear wall may be spaced from each other by a horizontal distance. The body may have a bottom wall that may define a substantially horizontal bottom surface. The body may define a slot located between the front wall and the rear wall. The slot may be configured to receive a flexible material. The body of the hembar may define a vertical distance from an opening of the slot to the bottom wall. The horizontal distance may be greater than the vertical distance. The body may have a center of gravity that is aligned with the slot. The hembar may include a spline around which an end portion of the flexible material may be wrapped. The spline may be located in a recess formed in the body of the hembar. The flexible material may exit the hembar through the slot. The spline may be configured to be received in the slot such that the body of the hembar and the spline clamp the flexile material in the slot. The spline may be characterized by a wedge shape having a thin end and a thick end. The wedge shape of the spline may substantially correspond to a shape of the slot in the body. The slot may receive the flexible material without clamping the flexible material. The spline may be captured in the recess. The end portion of the flexible material is attached to an outer surface of the spline. The hembar may be configured to clamp the flexible material within the slot. The body may include a first piece that includes a front wall and a second piece that includes the rear wall. The first and second pieces may slidably attach to one another. The spline may be a rubber spline. The rubber spline may be elongate within an opening defined by the first piece and the second piece. The rubber spline may be configured to exert a force on the first piece and the second piece such that the flexible material is clamped within the slot. The body may include a single piece. The body may be configured to deform such that the flexible material is received and clamped within the slot. The hembar may include an interior member that may capture an end portion of the flexible material. The interior member may be located in a recess formed in the body of the hembar. The flexible material may exit the hembar through the slot. The body of the hembar may be configured to rotate about the interior member such that the body of the hembar may hang substantially level in a radial direction. The spline around which the end portion of the flexible material may be wrapped may be located in a recess formed in the interior member. The slot may be located at a point (e.g., midpoint) between the front wall and the rear wall. A weight of the hembar may be divided substantially equally on either side of the slot. The slot may be formed between a first surface and a second surface of the body. The flexible material may be planar along at least one of the first surface or the second surface, for example, in the slot before exiting the body. A depth of the hembar may be at least two times a height of the hembar.

A hembar for attachment to an end portion of a flexible material may include a body and a spline. The body may define a recess that may be configured to receive the end portion of the flexible material through a gap in the body. The spline may be received within the recess. The spline may be configured to clamp the flexible material against an inner surface of the recess. The body may include a planar vertical surface that may be configured such that the flexible material is arranged adjacent to the planar vertical surface, for example, after exiting the recess. The body may have a vertical portion that may be connected to a horizontal portion, for example, to form an L-shaped structure. The body may include a front portion connected to the vertical portion, for example, to form the recess. The gap may be defined between the front portion and the horizontal portion. The recess may be vertically-oriented in the vertical position. The recess may be horizontally-oriented in the horizontal position. The body may have a front defining a substantially vertical front surface and a rear wall defining a substantially vertical rear surface. The front wall and the rear wall may be spaced from each other by a horizontal distance. The body may have a bottom wall that may define a substantially horizontal bottom surface. The gap may be located between the front wall and the rear wall. The body of the hembar may define a vertical distance from an opening of the gap to the bottom wall. The horizontal distance may be greater than the vertical distance. The gap may be formed between the planar vertical surface and a second surface of the body. The flexible material may be planar along the planar vertical surface, for example, after exiting the recess and before exiting the body. The spline may include a wedge-shaped spline that may be configured to clamp the flexible material against the inner surface of the recess. The flexible material may be wrapped around the spline in the recess. The flexible material may be attached to the spline, for example, using an adhesive. The planar vertical surface may have an adhesive for attaching the flexible material to the planar vertical surface.

An apparatus may include a first portion, a second portion, and a compressible member. The second portion may be configured to slidably engage the first portion. The first portion and the second portion may define a slot configured to receive a piece of fabric. The compressible member may exert a force on the first portion and the second portion, for example, to cause the first portion and the second portion to clamp the piece of fabric within the slot. The first portion and the second portion may be configured such that a width of the slot is adjustable. The first portion may define a first attachment surface. The second portion may define a second attachment surface. The first attachment surface may be configured to press against the second attachment surface, for example, when the first portion is slidably engaged with the second portion. The compressible member may be a hollow rubber spline. The first attachment surface may define a rib. The second attachment surface may define a groove that may be configured to receive the rib when the first portion is slidably engaged with the second portion. The first portion may define a first flange and a first channel. The second portion may define a second flange and a second channel. The first flange may be received within the second channel and the second flange may be received within the first channel such that alignment may be maintained between the first portion and the second portion.

A method of attaching a flexible material to a hembar may be provided. The method may include providing an elongated hembar body that may have a front portion and a rear portion that may be configured to slidably engage with one another. The rear portion may define a first attachment surface. The front portion may define a second attachment surface. The front portion ad the rear portion may define a slot between the first attachment surface and the second attachment surface. The slot may be configured to receive the flexible material. The rear portion may define a cavity. The method may include securing the flexible material to the first attachment surface. The method may include applying a tensile force to opposed ends of a rubber spline, for example, such that the rubber spline is reduced from a first diameter to a second diameter. The method may include inserting the rubber spline into the cavity, for example, while the tensile force is applied to the rubber spline. The rubber spline may be elongate along the elongated hembar body. The method may include sliding the front portion into engagement with the rear portion, for example, from a first end of the rear portion to a second end of the rear portion. The method may include removing the tensile force from the opposed ends of the rubber spline such that the rubber spline expands within the cavity to a third diameter. The third diameter may be less than the first diameter and greater than the second diameter. The rubber spline may exert a force on the front portion and the rear portion such that the flexible material is clamped within the slot. The method may include aligning the front portion and the rear portion such that respective ends thereof are aligned. The flexible material may be secured to the first attachment surface, for example, using double-sided tape. The rear portion may define a groove along the first attachment surface. The front portion may define a rib along the second attachment surface. The rib may be configured to clamp the flexible material within the groove, for example, when the tensile force is removed from the opposed ends of the rubber spline. The front portion may define a first flange and a first channel. The rear portion may define a second flange and a second channel. The first flange may be received within the second channel and the second flange may be received within the first channel, for example, when the front portion is slid into engagement with the rear portion.

A flexible material may be clamped between first and second portion of an apparatus. The first and second portions may slidably engage with one another. The first portion may define a first attachment surface and the second portion may define a second attachment surface. The first portion and the second portion may define a slot between the first attachment surface and the second attachment surface. The slot may be configured to receive the flexible material. The first portion may define a cavity. The flexible material may be secured to the first attachment surface. A tensile force may be applied to opposed ends of a rubber spline such that the rubber spline may be stretched from a first length to a second length and a diameter of the rubber spline is reduced from a first diameter to a second diameter. The rubber spline may be inserted into the cavity, for example, while the tensile force is applied to the rubber spline. The rubber spline may be elongate along the elongated hembar body. The second portion may be slid into engagement with the first portion from a first end of the first portion to a second end of the first portion. The tensile force may be removed from the opposed ends to the rubber spline such that the rubber spline may expand within the cavity to a third diameter. The third diameter may be less than the first diameter and greater than the second diameter. The rubber, spline may exert a force on the first portion and the second portion such that the flexible material is clamped within the slot.

DETAILED DESCRIPTION

Figure 1:
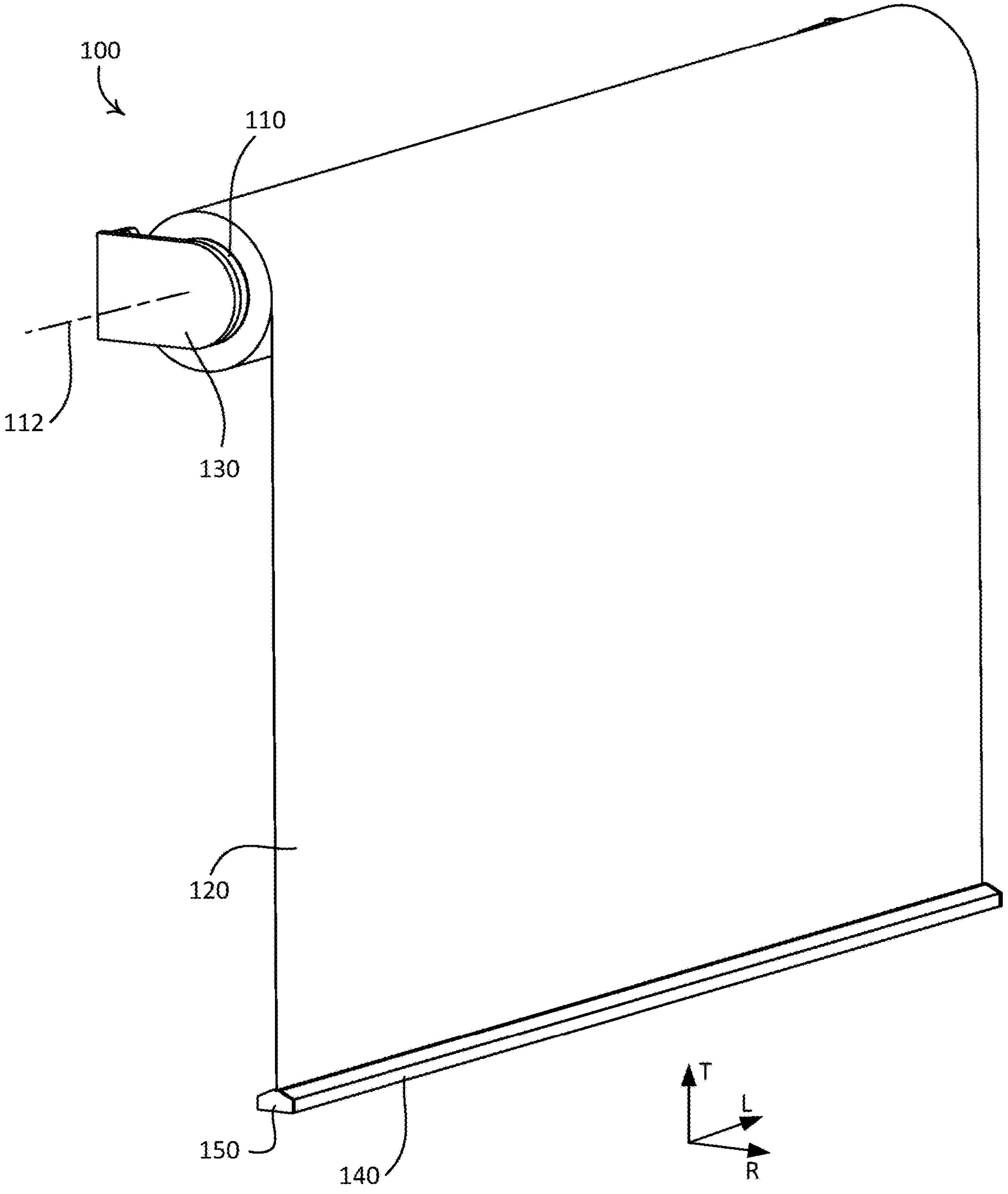
FIG. 1 is an example window treatment system.
Figure 2A:
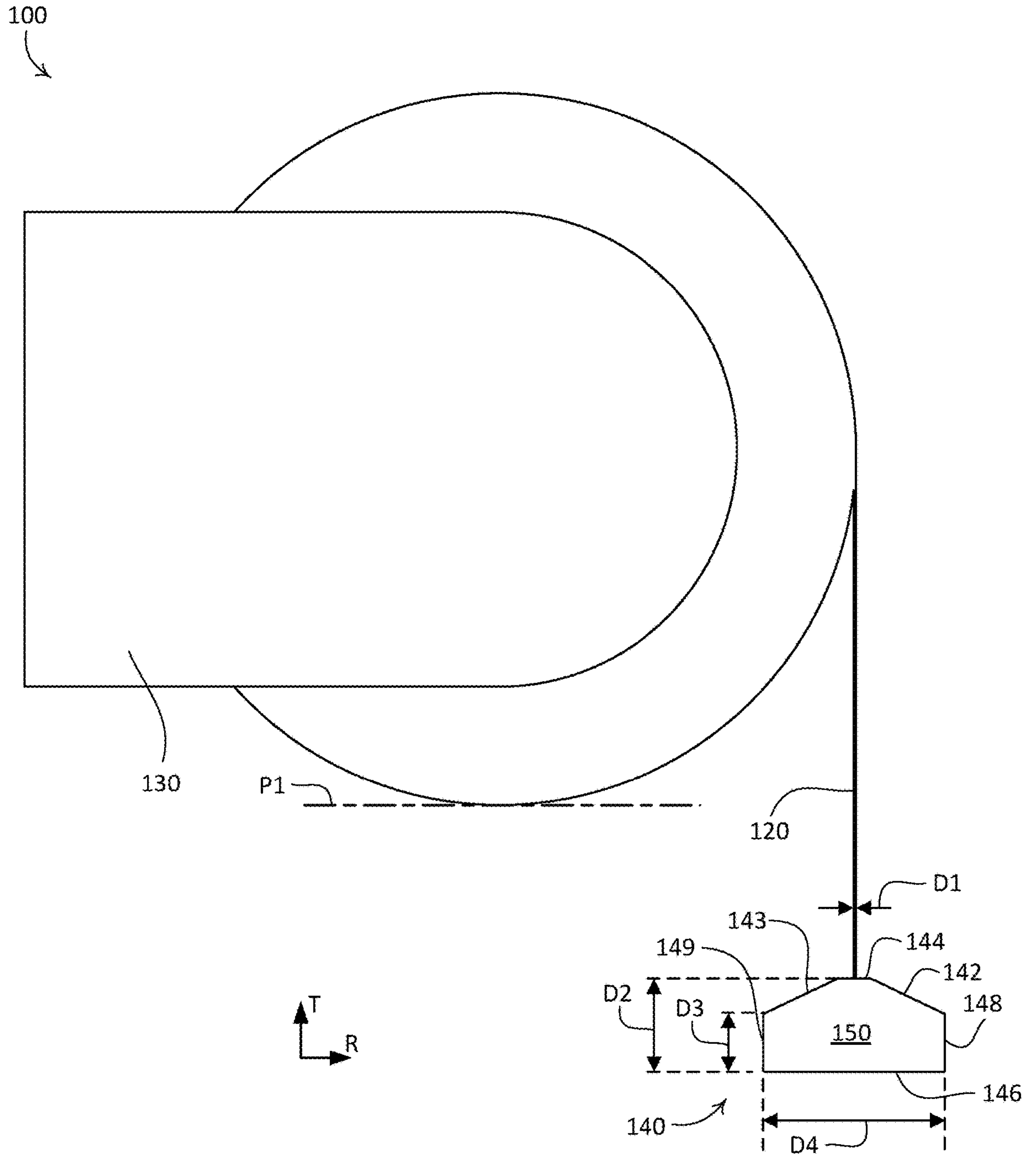
FIG. 2A is aside view of the example window treatment system shown in FIG. 1 with a flexible material shown in a reverse roll orientation and in a raised position.
Figure 3:
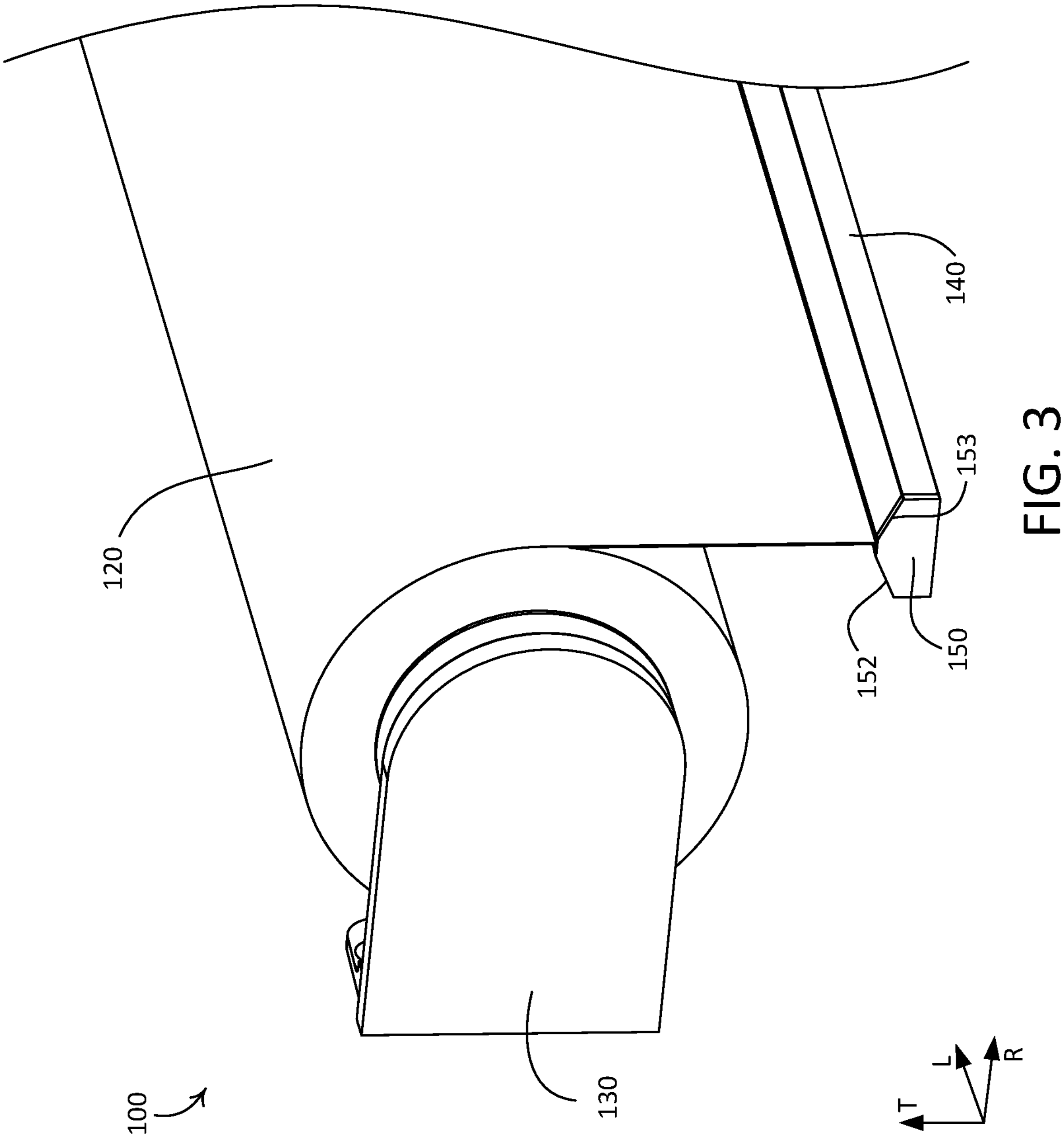
FIG. 3 is an enlarged perspective view of the example window treatment system shown in FIG. 1.

FIG. 1 depicts an example window treatment system 100 that includes a roller tube 110 and a flexible material 120 windingly attached to the roller tube 110. The window treatment system 100 includes one or more (e.g., two) mounting brackets 130 configured to be coupled to or otherwise mounted to a structure. For example, each of the mounting brackets 130 may be configured to be mounted to (e.g., attached to) a window frame, a wall, or other structure, such that the window treatment system 100 is mounted proximate to an opening (e.g., over the opening or in the opening), such as a window for example. The roller tube 110 may be a rotational element that is elongate along a longitudinal direction L, and that is rotatably mounted (e.g., rotatably supported) by the mounting brackets 130. The roller tube 110 may define a longitudinal axis 112. The longitudinal axis 112 may extend along the longitudinal direction L. The flexible material 120 may be windingly attached to the roller tube 110, such that rotation of the roller tube 110 causes the flexible material 120 to wind around or unwind from the roller tube 110 along a transverse direction T that extends perpendicular to the longitudinal direction L. For example, rotation of the roller tube 110 may cause the flexible material 120 to move between a raised (e.g., open) position (e.g., as shown in FIGS. 2A and 3) and a lowered (e.g., closed) position (e.g., as shown in FIG. 1) along the transverse direction T. The mounting brackets 130 may extend from the structure in a radial direction R (such as from a wall as shown in FIG. 1) or in the transverse direction T (e.g., a downward direction, such as from a ceiling). The radial direction R may be defined as a direction perpendicular to the structure and the longitudinal axis 112.

The flexible material 120 may include a first end (e.g., a top or upper end) that is coupled to the roller tube 110 and a second end (e.g., a bottom or lower end) that is coupled to a hembar 140 (e.g., a bottom bar). For example, the hembar 140 may be configured to engage a lower end of the flexible material 120. The hembar 140 may be elongate along the longitudinal axis 112 (e.g., in the longitudinal direction L). The hembar 140 may be configured, for example weighted, to cause the flexible material 120 to hang vertically. Rotation of the roller tube 110 may cause the hembar 140 to move toward or away from the roller tube 110 between the raised and lowered positions. An end cap 150 may be installed on each end of the hembar 140. The end cap 150 may be configured to cover the opposed ends of the hembar 140. For example, the end cap 150 may provide a finished end to the hembar 140.

The flexible material 120 may be any suitable material, or form any combination of materials. For example, the flexible material 120 may be "scrim," woven cloth, non-woven material, light-control film, screen, and/or mesh. The window treatment system 100 may be any type of window treatment. For example, the window treatment system 100 may be a roller shade as illustrated, a soft sheer shade, a drapery, a cellular shade, a Roman shade, or a Venetian blind. As shown, the flexible material 120 may be a material suitable for use as a shade fabric, and may be alternatively referred to as a covering material. However, the flexible material 120 is not limited to shade fabric. For example, in accordance with an alternative implementation of the window treatment system 100 as a retractable projection screen, the flexible material 120 may be a material suitable for displaying images projected onto the flexible material.

The window treatment system 100 may be motorized or manual. A motorized window treatment system may include a drive assembly, e.g., a motor drive unit (not shown). The drive assembly may at least partially be disposed within the roller tube 110. For example, the drive assembly may include a control circuit that may include a microprocessor and may be mounted to a printed circuit board. The drive assembly and/or the control circuit may be powered by a power source (e.g., an alternating-current power source or a direct-current power source) provided by electrical wiring. The drive assembly may be operably coupled to the roller tube 110 such that when the drive assembly is actuated, the roller tube 110 rotates. The drive assembly may be configured to rotate the roller tube 110 of the example window treatment system 100 such that the flexible material 120 is operable between the raised position and the lowered position.

FIG. 2A is a side view of the example window treatment system 100 shown in FIG. 1 with the flexible material 120 shown in a reverse roll orientation and in a raised position. The flexible material 120 may have a thickness D1. The thickness D1 may vary based on the type of fabric or material selected as the flexible material 120. The hembar 140 may be configured to receive flexible materials of various thicknesses D1. For example, the hembar 140 may be configured to deform such that the flexible material 120 is received and clamped within the hembar 140. The flexible material 120 may be windingly attached to a roller tube (e.g., such as the roller tube 110 shown in FIG. 1) such that the flexible material 120 hangs from the front side of the roller tube in the reverse roll orientation (e.g., as shown in FIG. 2A).

The hembar 140 may define a top wall 144 and a bottom wall 146. The bottom wall 146 may define a substantially horizontal bottom surface. The top wall 144 may be a distance D2 from the bottom wall 146. The distance D2 may define a height of the hembar 140. The top wall 144 and the bottom wall 146 may be parallel.

The hembar 140 may define a front wall 148 and a rear wall 149. The front wall 148 may define a substantially vertical front surface. The rear wall 149 may define a substantially vertical rear surface. The front wall 148 and the rear wall 149 may be substantially perpendicular to the top wall 144 and the bottom wall 146. The front wall 148 and the rear wall 149 may be parallel. The front wall 148 and the rear wall 149 may extend a distance D3 from the bottom wall 146.

The front wall 148 may be spaced from each other by a distance D4 from the rear wall 149, which may define a depth of the hembar 140. The depth of the hembar 140 (e.g., the distance D4) may be greater than the height (e.g., the distance D2). For example, the distance D4 may be two times the distance D2 or approximately two times the distance D2. Although not shown in FIG. 2A, the distance D4 may be more than two times the distance D2, or may be less than two times the distance D2. Similarly, the depth of the hembar 140 (e.g., the distance D4) may be less than the height (e.g., the distance D2) of the hembar 140. The center of gravity of hembar 140 may be located immediately below a point 120A (e.g., as shown in FIG. 2B) where the flexible material 120 meets the hembar to enable the hembar 140 to hang substantially level in the radial direction R even though the distance D4 may be two or more times the distance D2.

The hembar 140 may define upper surfaces 142, 143 with sloped profiles. The sloped profile of the upper surfaces 142, 143 may be a single linear slope, a curved slope (e.g., a convex or concave curved slope), a piece-wise slope of multiple linear segments, or other suitable slope and/or profile. In addition, the hembar 140 may have a side profile of another shape, for example, rectangular, triangular, or other suitable shape, where the depth of the hembar is greater than the height of the hembar.

The hembar 140 may be configured to clamp to the bottom end of the flexible material 120, which may allow the hembar to hang substantially level in the longitudinal direction L along the length of the hembar 140. For example, the hembar 140 may have two separate portions configured to be forced together to clamp the flexible material 120 (e.g., as will be described in greater detail below). In addition, the hembar 140 may be a single piece (e.g., a body having a single piece) configured to clamp to the flexible material 120. For example, the hembar 140 may be a single piece of metal having a slot (not shown) configured to receive the flexible material 120. After the flexible material 120 is inserted into the slot, the hembar 140 (e.g., the one-piece metal hembar) may be deformed, such that the hembar 140 clamps onto the flexible material 120.

Figure 2B:
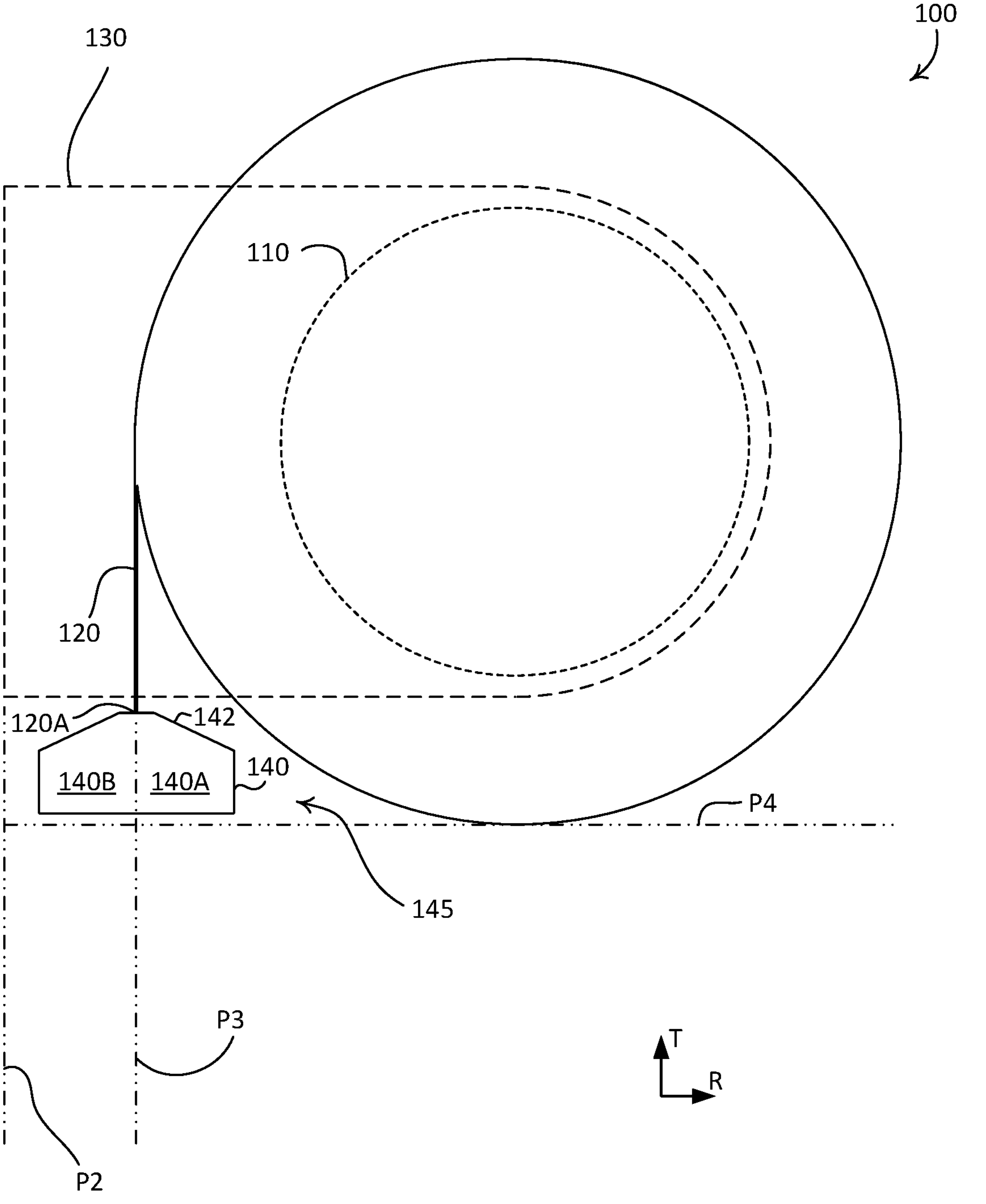
FIG. 2B is a side view of the example window treatment system shown in FIG. 1 with the flexible material shown in a regular roll orientation and in a raised position.

FIG. 2B is a side view of the example window treatment system 100 shown in FIG. 1 with the flexible material 120 shown in a regular roll orientation in a fully-raised position. In FIG. 2B, the mounting bracket 130 and the roller tube 110 are shown in dashed lines. The mounting bracket 130 may be mounted to a structure, e.g., a wall that defines a first plane P2 extending in the transverse direction T and the longitudinal direction L (e.g., as shown in FIG. 1). The flexible material 120 may be windingly attached to the roller tube such that the flexible material 120 hangs from a rear side of the roller tube 110 in the regular roll orientation (e.g., as shown in FIG. 2B). The hembar 140 may define a front half portion 140A and a rear half portion 140B that are divided by a plane P3 extending through the hanging flexible material 120 above the hembar 140 in the transverse direction T and the longitudinal direction L. The front half portion 140A and the rear half portion 140B may have symmetric profiles. The front half portion 140A and the rear half portion 140B may have profiles of different shapes and/or sizes and thereby not be symmetrical. When the flexible material 120 is in the fully-raised position, a bottom of the flexible material 120 wound onto the roller tube may define a bottom plane P4 extending in the radial, direction R and the longitudinal direction L (e.g., tangential to the bottom of the flexible material wound onto the roller tube 110).

When the flexible material 120 is in the fully-raised position, the hembar 140 may be configured to fit into a space 145 below the flexible material 120 wrapped around the roller tube 110 (e.g., as shown in FIG. 2B) such that the hembar 140 may be hidden from sight (e.g., difficult to see and/or out of view when viewed from a distance in front of the window treatment system 100). The space 145 in which the hembar 140 may be located may be bounded on the bottom by the plane P4, which is tangential to the bottom of the flexible material 120 wound around the roller tube 110 (e.g., in the fully-raised position). The space 145 in which the hembar 140 may be located may also be bounded at the rear by the plane P2, which may be defined by the wall to which the mounting brackets 130 are mounted. In addition, the front half portion 140A of the hembar 140 may be located in a space that is below the flexible material 120 wrapped around the roller tube 110 and is bounded at the bottom by the plane P4 and at the rear by the plane P3. The sloped profile of the front tapper surface 142 may help the hembar 140 to fit into the space 145. The front upper surface 142 of the hembar 140 may rest against the flexible material 120 when the flexible material 120 is in the fully-raised, position. According to one example, the front upper surface 142 may be concave where the curvature of the concavity matches or substantially matches the convexity of the roller tube 110 or the convexity of the flexible material 120 when it is in the fully-raised position. A similar concept may apply when the window treatment system 100 is configured in the reverse roll orientation as shown in FIG. 2A.

FIG. 3 is an enlarged view of the example window treatment system 100 shown in FIG. 1 showing one of the end caps 150 of the hembar 140 in greater detail. As previously mentioned, the end cap 150 may be configured to cover an end of the hembar 140. The end cap 150 may have a profile that is substantially similar to the profile of the hembar 140 as shown in FIG. 3. The end cap 150 may have a profile that is different than the profile of the hembar 140. The end cap 150 may define sloped upper surfaces 152, 153 having slope profiles that are substantially the same as the upper surface 142, 143 of the hembar 140 shown in FIG. 2A.

Figure 4A:
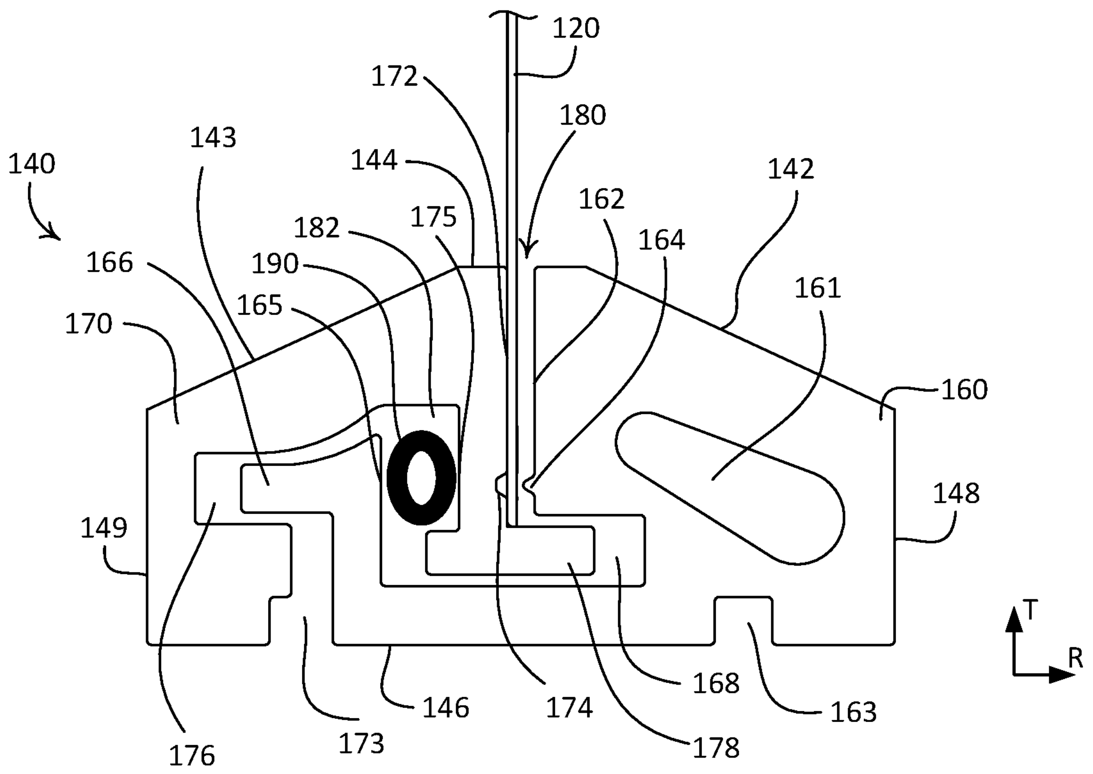
FIGS. 4A and 4B depict side views of an example hembar and flexible material of the example window treatment system shown in FIG. 1.
Figure 4B:
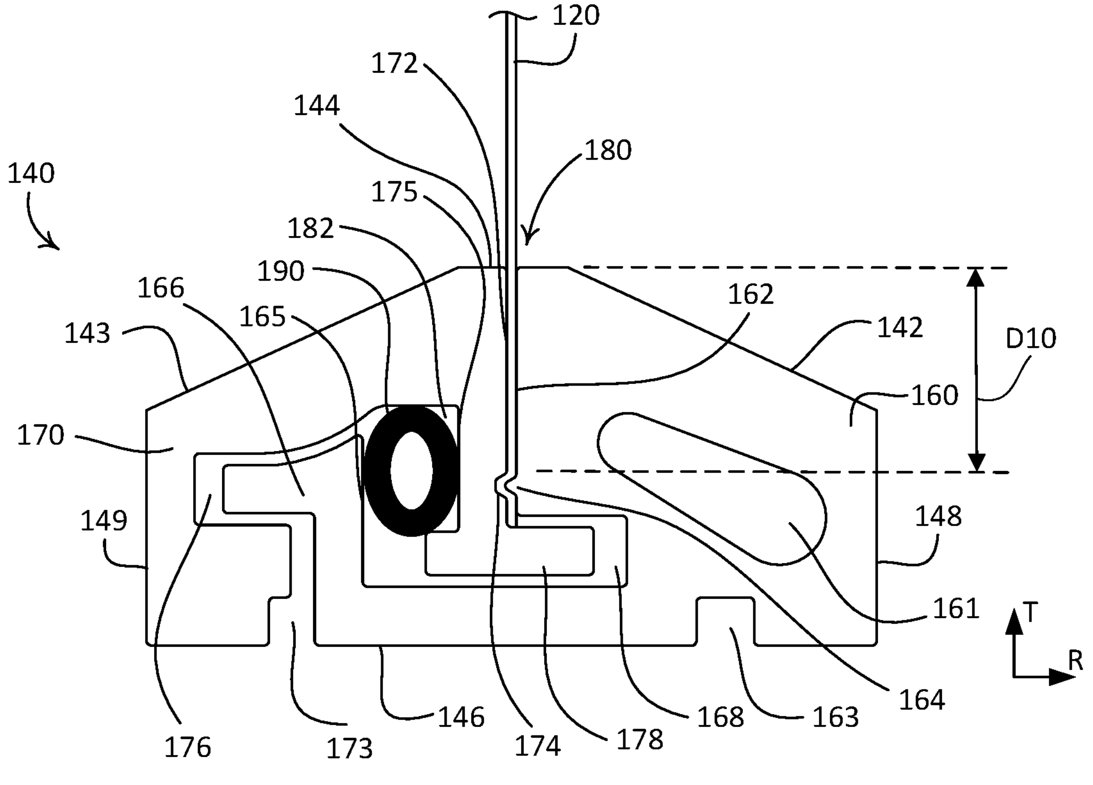

FIGS. 4A and 4B depict side views of the hembar 140 and the flexible material 120 of the window treatment system 100 with the end cap 150 removed. The hembar 140 may include a body including two or more pieces. The two or more pieces may slidably attach to one another. The two or more pieces may include a front portion 160 (e.g., a first piece) and a rear portion 170 (e.g., a second piece) that may both be elongate along the hembar 140 in the longitudinal direction L. The front portion 160 or the rear portion 170 may be positioned to the front of the window treatment system 100 (e.g., in the radial direction R as shown in FIG. 1).

For example, the rear portion 170 may be configured to slidably engage the front portion 160. The front portion 160 and the rear portion 170 may define a slot 180 (e.g., a gap). The slot 180 may be formed between a first attachment surface 162 (e.g., a vertical surface) of the front portion 160 and, a second attachment surface 172 (e.g., a vertical surface) of the rear portion 170. The slot 180 may extend along a length of the hembar 140, for example, in the longitudinal direction L as shown in FIGS. 1 and 3. The slot 180 may be located at a point (e.g., a midpoint) between the front wall 148 and the rear wall 149 of the hembar 140. The front portion 160 may define the front wall 148. The rear portion 170 may define the rear wall 149. The slot 180 may be configured to receive the flexible material 120 (e.g., a piece of fabric). The front portion 160 and the rear portion 170 may be configured to clamp the flexible material 120 within the slot 180. When the front portion 160 is slidably engaged with the rear portion 170, the first attachment surface 162 may be configured to engage the second attachment surface 172. For example, the first attachment surface 162 and the second attachment surface 172 may be configured to exert opposing forces on each other. The flexible material 120 may be attached to the first attachment surface 162 or the second attachment surface 172 (e.g., as shown in FIG. 4A) using an adhesive (e.g., double-sided sticky tape).

The front portion 160 may include one or more ribs or teeth, e.g., a rib 164 that extends from the first attachment surface 162. For example, the first attachment surface 162 may define the rib 164. The rib 164 may be elongate along the hembar 140 in the longitudinal direction L. The rear portion 170 may include a groove 174 in the second attachment surface 172. For example, the second attachment surface 172 may define the groove 174. The groove 174 may be elongate along the hembar 140 in the longitudinal direction L. The rib 164 and the groove 174 may be aligned such that the rib 164 is received within the groove 174 when the first attachment surface 162 engages the second attachment surface 172. Stated differently, the groove 174 may receive the rib 164 when the front portion 160 is slidably engaged with the rear portion 170. The rib 164 and the groove 174 may be configured such that the flexible material 120 is clamped within the slot 180.

The hembar 140 may include a compressible member 190. The compressible member 190 may be a hollow rubber spline, or some other type of compressible strip. The compressible member 190 may be elongate within an opening 182 defined by the front portion 160 and the rear portion 170. The compressible member 190 may be configured to exert a force on the front portion 160 and the rear portion 170 to push the front portion 160 and the rear portion 170 together, such that the flexible material 120 is clamped within the slot 180. The compressible member 190 may be configured to exert the force on a first inside surface 165 of the front portion 160 and a second inside surface 175 of the rear portion 170. As shown in FIG. 4A, when the compressible member 190 is stretched to a stretched position a cross-sectional diameter of the compressible member 190 may be reduced such that the compressible member 190 is spaced from the first inside surface 165 and/or the second inside surface 175. As shown in FIG. 4B, the compressible member 190 may exert the force when expanding from the stretched position. For example, the compressible member 190 may engage the first inside surface 165 and/or the second inside surface 175 when expanded from the stretched position. The front portion 160 may be secured to the rear portion 170. For example, the force exerted by the compressible member 190 may be configured to secure the front portion 160 to the rear portion 170.

A width of the slot 180 may be adjustable. For example, the width of the slot may be variable (e.g., continuously variable) from a first width to a second width. Referring to FIG. 4A, the slot 180 is shown with a width greater than the width shown in FIG. 4B. The front portion 160 and the rear portion 170 may be configured such that the width of the slot 180 is adjustable. The hembar 140 may define a center of gravity that is aligned with the slot 180. For example, a weight of the hembar 140 may be divided substantially equally on either side of the slot 180. The front portion 160 may define a chamber 161 that is elongate along the hembar 140. The chamber 161 may be sized such that the center of gravity of the hembar 140 is aligned with the slot 180. For example, the size of the chamber 161 may be configured such that the weight of the hembar 140 is balanced on either side of the slot 180. The balance between the front portion 160 and the rear portion 170 may be achieved in other manners including, for example, one or more chambers and/or weights in either or both of the front portion 160 and the rear portion 170.

The front portion 160 may define a first flange 166 and a first channel 168. The rear portion 170 may define a second flange 178 and a second channel 176. The second channel 176 may be configured to receive the first flange 166. The first channel 168 may be configured to receive the second flange 178. The first flange 166 may be received within the second channel 176 and the second flange 178 may be received within the first channel 168 such that alignment is maintained between the front portion 160 and the rear portion 170. The first channel 168, the second channel 176, the first flange 166, and/or the second flange 178 may be configured such that the width of the slot 180 is adjustable. For example, the first channel 168, the second channel 176, the first flange 166, and/or the second flange 178 may be configured such that pieces of fabric having various thicknesses may be received within the slot 180.

The front portion 160 and the rear portion 170 may define a channel 173 that is elongate along the bottom wall 146 of the hembar 140. The channel 173 may be configured such that the first flange 166 can be inserted into the second channel 176. The front portion 160 may define a cavity 163 that is elongate along the bottom wall 146 of the hembar 140, for example, in the longitudinal direction L. The cavity 163 may be sized such that the center of gravity of the hembar 140 is aligned with the slot 180. The cavity 163 may be configured to have a width in the radial direction R that is substantially similar to a width of the channel 173, for example, such that the hembar 140 has a balanced appearance when viewed from the bottom. The front portion 160 may be positioned on the interior side (e.g., a side adjacent to the structure) of the motorized window treatment system 100.

The end cap 150 may cover the ends of the front portion 160 and the rear portion 170. The end cap 150 may be configured to be connected to the front portion 160. The rear portion 170 may be configured to move (e.g., slide) with respect to the end cap 150, for example, as the compressible member 190 expands. Alternatively, the front portion 160 and the rear portion 170 may be pulled together (e.g., into secure engagement) by one or more fasteners (not shown). The one or more fasteners may include screws, rivets, and/or the like. In addition, the front portion 160 and the rear portion 170 may be locked together by one or more snaps (not shown).

The front portion 160 and the rear portion 170 may be configured to clamp the flexible material 120, for example, such that the flexible material 120 is planar for at least a distance D10 from the rib 164 to the top wall 144 before the flexible material exits the hembar 140 (e.g., along the first and second attachment surfaces 162, 172 of the slot 180). For example, the flexible material 120 may define a planar section defined by the distance D10 from the rib 164 to the top wall 144. The planar section of the flexible material 120 along the distance D10 may be in line with the center of gravity of the hembar 140 (e.g., vertically aligned). The planar section of the flexible material 120 along the distance D10 may enable the hembar to hang substantially level in the radial direction R. For example, the planar section of the flexible material 120 along the distance D10 and the clamping of the flexible material 120 by the hembar 140 along the distance D10 may allow the mass of the hembar 140 under the force of gravity to apply a downward force (e.g., pull) on the flexible material 120 (e.g., vertically downward) along the transverse direction T. Stated another way, this configuration of the flexible material 120 and the hembar 140 may assist in minimizing the tendency of the flexible material 120 to curl at the attachment point to the hembar 140 which may cause the hembar 140 to not hang level.

Figure 5A:
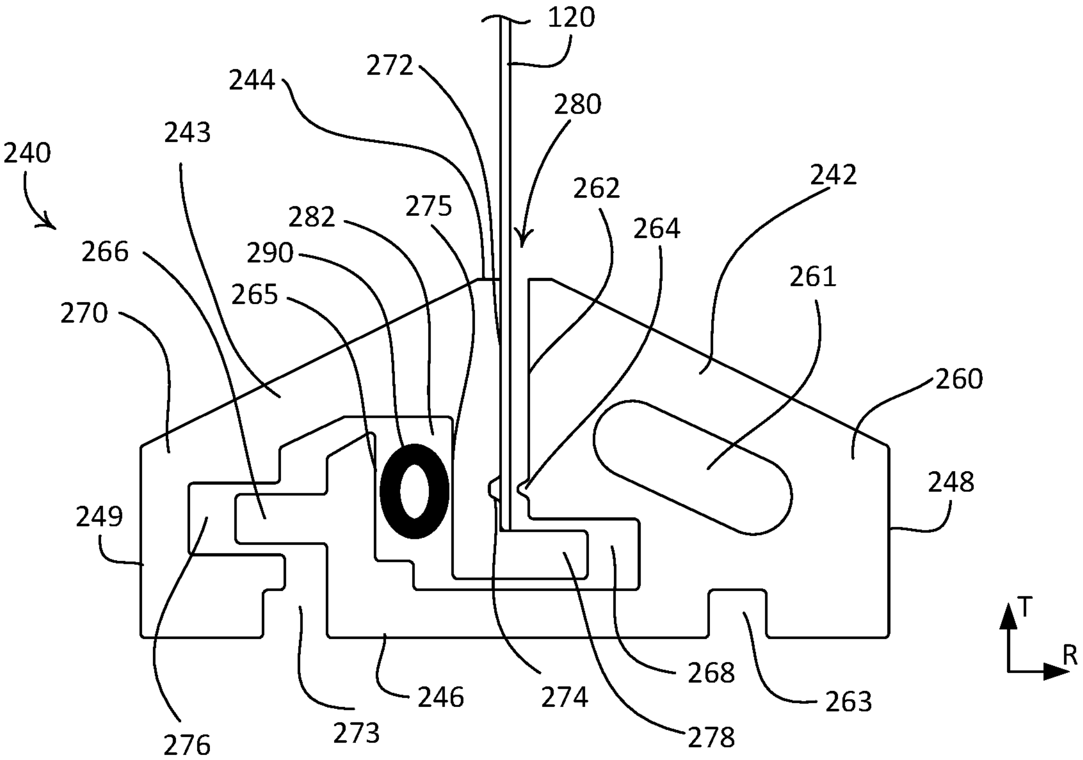
FIGS. 5A and 5B depict side views of another example hembar and flexible material of the example window treatment system shown in FIG. 1.
Figure 5B:
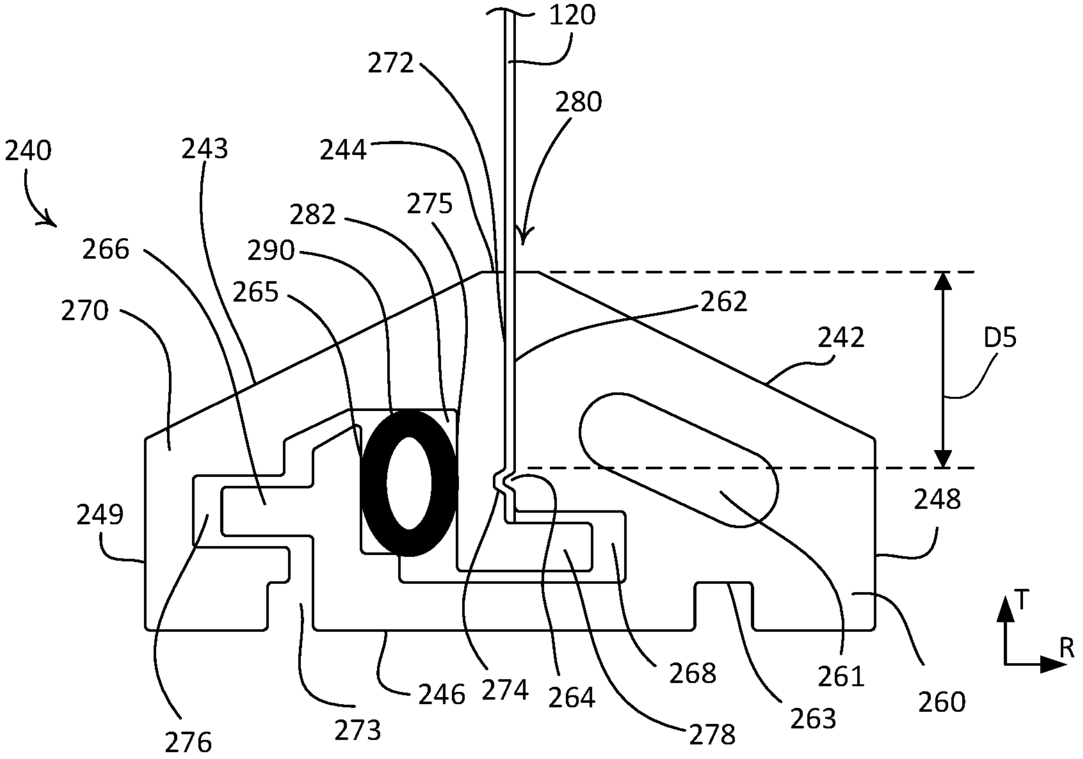

FIGS. 5A and 5B depict side views of another example hembar 240 that may be attached to the flexible material 120 of the window treatment system 100 with the end cap 150 removed. The hembar 240 may define a top wall 244 and a bottom wall 246. The bottom wall 246 may define a substantially horizontal bottom surface. The hembar 240 may define a front wall 248 and a rear wall 249. The front wall 248 may define a substantially vertical front surface. The rear wall 249 may define a substantially vertical rear surface. The front wall 248 and the rear wall 249 may be substantially perpendicular to the bottom wall 246. The front wall 248 and the rear wall 249 may be parallel. As with the hembar 140 shown in FIG. 2A, the depth of the hembar 240 may be greater than (e.g., two times or approximately two times) the height of the hembar 240. Nonetheless, the depth, and the height may have different proportionalities, including the depth of the hembar 240 being less than the height of the hembar 240, for example.

The hembar 240 may include a body including two or more pieces. The two or more pieces may slidably attach to one another. The two or more pieces may include a front portion 260 (e.g., a first piece) and a rear portion 270 (e.g., a second piece) that may both be elongate along the hembar 240 in the longitudinal direction L (e.g., as shown in FIG. 1). The front portion 260 or the rear portion 270 may be positioned to the front of the window treatment system 100 (e.g., in the radial direction R as shown in FIG. 1).

For example, the rear portion 270 may be configured to slidably engage the front portion 260. The front portion 260 and the rear portion 270 may define a slot 280 (e.g., a gap). The slot 280 may extend along a length of the hembar 240, for example, in the longitudinal direction L. The slot 280 may be located at a point (e.g., a midpoint) between the front wall 248 and the rear wall 249 of the hembar 240. The front portion 260 may define the front wall 248. The rear Portion 270 may define the rear wall 249. The slot 280 may be configured to receive the flexible material 120 (e.g., a piece of fabric). The front portion 260 and the rear portion 270 may be configured to clamp the flexible material 120 within the slot 280.

The front portion 260 may define a first attachment surface 262 and the rear portion 270 may define a second attachment surface 272. When the front portion 260 is slidably engaged with the rear portion 270, the first attachment surface 262 may be configured to engage the second attachment surface 272. For example, the first attachment surface 262 and the second attachment surface 272 may be configured to exert opposing forces on each other. The flexible material 120 may be attached to the first attachment surface 262 or the second attachment surface 272 (e.g., as shown in FIG. 5A) using an adhesive (e.g., double-sided sticky tape).

The front portion 260 may include a rib 264 that extends from the first attachment surface 262. For example, the first attachment surface 262 may define the rib 264. The rib 264 may be elongate along the hembar 240 in the longitudinal direction L. The rear portion 270 may include a groove 274 in the second attachment surface 272. For example, the second attachment surface 272 may define the groove 274. The groove 274 may be elongate along the hembar 240 in the longitudinal direction L. The rib 264 and the groove 274 may be aligned such that the rib 264 is received within the groove 274 when the first attachment surface 262 engages the second attachment surface 272. Stated differently, the groove 274 may receive the rib 264 when the front portion 260 is slidably engaged with the rear portion 270. The rib 264 and the groove 274 may be configured such that the flexible material 120 is clamped within the slot 280.

The hembar 240 may include a compressible member 290. The compressible member 290 may be a hollow rubber spline, or some other type of compressible strip. The compressible member 290 may be elongate within an opening 282 defined by the front portion 260 and the rear portion 270. The compressible member 290 may be configured to exert a force on the front portion 260 and the rear portion 270 to push the front portion 260 and the rear portion 270 together, such that the flexible material 120 is clamped within the slot 280. The compressible member 290 may be configured to exert the force on a first inside surface 265 of the front portion 260 and a second inside surface 275 of the rear portion 270. As shown in FIG. 5A, when the compressible member 290 is stretched to a stretched position a cross-sectional diameter of the compressible member 290 may be reduced such that the compressible member 290 is spaced from the first inside surface 265 and/or the second inside surface 275. As shown in FIG. 5B, the compressible member 290 may exert the force when expanding from the stretched position. For example, the compressible member 290 may engage the first inside surface 265 and/or the second inside surface 275 when expanded from the stretched position. The front portion 260 may be secured to the rear portion 270. For example, the force exerted by the compressible member 290 may be configured to secure the front portion 260 to the rear portion 270.

A width of the slot 280 may be adjustable. For example, the width of the slot may be variable (e.g., continuously variable) from a first width to a second width. Referring to FIG. 5A, the slot 280 is shown with a width greater than the width shown in FIG. 5B. The front portion 260 and the rear portion 270 may be configured such that the width of the slot 280 is adjustable. The hembar 240 may define a center of gravity that is aligned with the slot 280. For example, a weight of the hembar 240 may be divided substantially equally on either side of the slot 280. The front portion 260 may define a chamber 261 that is elongate along the hembar 240. The chamber 261 may be sized such that the center of gravity of the hembar 240 is aligned with the slot 280. For example, the size of the chamber 261 may be configured such that the weight of the hembar 240 is balanced on either side of the slot 280.

The front portion 260 may define, a first flange 266 and a first channel 268. The rear portion 270 may define a second flange 278 and a second channel 276. The second channel

276 may be configured to receive the first flange 266. The first channel 268 may be configured to receive the second flange 278. The first flange 266 may be received within the second channel 276 and the second flange 278 may be received within the first channel 268 such that alignment is maintained between the front portion 260 and the rear portion 270. The first channel 268, the second channel 276, the first flange 266, and/or the second flange 278 may be configured such that the width of the slot 280 is adjustable. For example, the first channel 268, the second channel 276, the first flange 266, and/or the second flange 278 may be configured such that pieces of fabric having various thicknesses may be received within the slot 280. In one aspect, the hembar 140 and the hembar 240 may differ in the configuration of the first flange 166 and the first channel 168, and the second flange 178 and the second channel 176 of the hembar 140 as compared to the first flange 266 and the first channel 268, and the second flange 278 and the second channel 276 of hembar 240.

The front portion 260 and the rear portion 270 may define a channel 273 that is elongate along the bottom wall 246 of the hembar 240. The channel 273 may be configured such that the first flange 266 can be inserted into the second channel 276. The front portion 260 may define a cavity 263 that is elongate along the bottom wall 246 of the hembar 240, for example, in the longitudinal direction L. The cavity 263 may be sized such that the center of gravity of the hembar 240 is aligned with the slot 280. The cavity 263 may be configured to have a width in the radial direction R that is substantially similar to a width of the channel 273, such that the hembar 240 has a balanced appearance when viewed from the bottom. The front portion 260 may be positioned on the interior side (e.g., a side adjacent to the structure) of the motorized window treatment system 100.

The end cap 150 may cover the ends of the front portion 160 and the rear portion 170. The end cap 150 may be configured to be connected to the front portion 160. The rear portion 170 may be configured to move (e.g., slide) with respect to the end cap 150, for example, as the compressible member 190 expands.

The front portion 260 and the rear portion 270 may be configured to clamp the flexible material 120, for example, such that the flexible material is planar for at least a distance D5 from the rib 264 to the top wall 244 before the flexible material exits the hembar 240. The planar section of the flexible material 120 along the distance D5 may be in line with the center of gravity of the hembar 240. The planar section of the flexible material 120 along the distance D5 may enable the hembar 240 to hang substantially level in the radial direction R. For example, the planar section of the flexible material 120 along the distance D5 and the clamping of the flexible material 120 by the hembar along the distance D5 may allow the mass of the hembar under the force of gravity to apply a downward force (e.g., pull) on the flexible material 120 (e.g., vertically downward) along the transverse direction T. Stated another way, this configuration of the flexible material 120 and the hembar 240 may assist in minimizing the tendency of the flexible material 120 to curl at the attachment point to the hembar 240 such that the hembar does not hang level.

Alternatively, the front portion 260 and the rear portion 270 may be pulled together (e.g., into secure engagement) by one or more fasteners (not shown). The one or more fasteners may include screws, rivets, and/or the like. In addition, the front portion and the rear portion 270 may be locked together by one or more snaps (not shown).

Figures 6A, 6B, 6C:
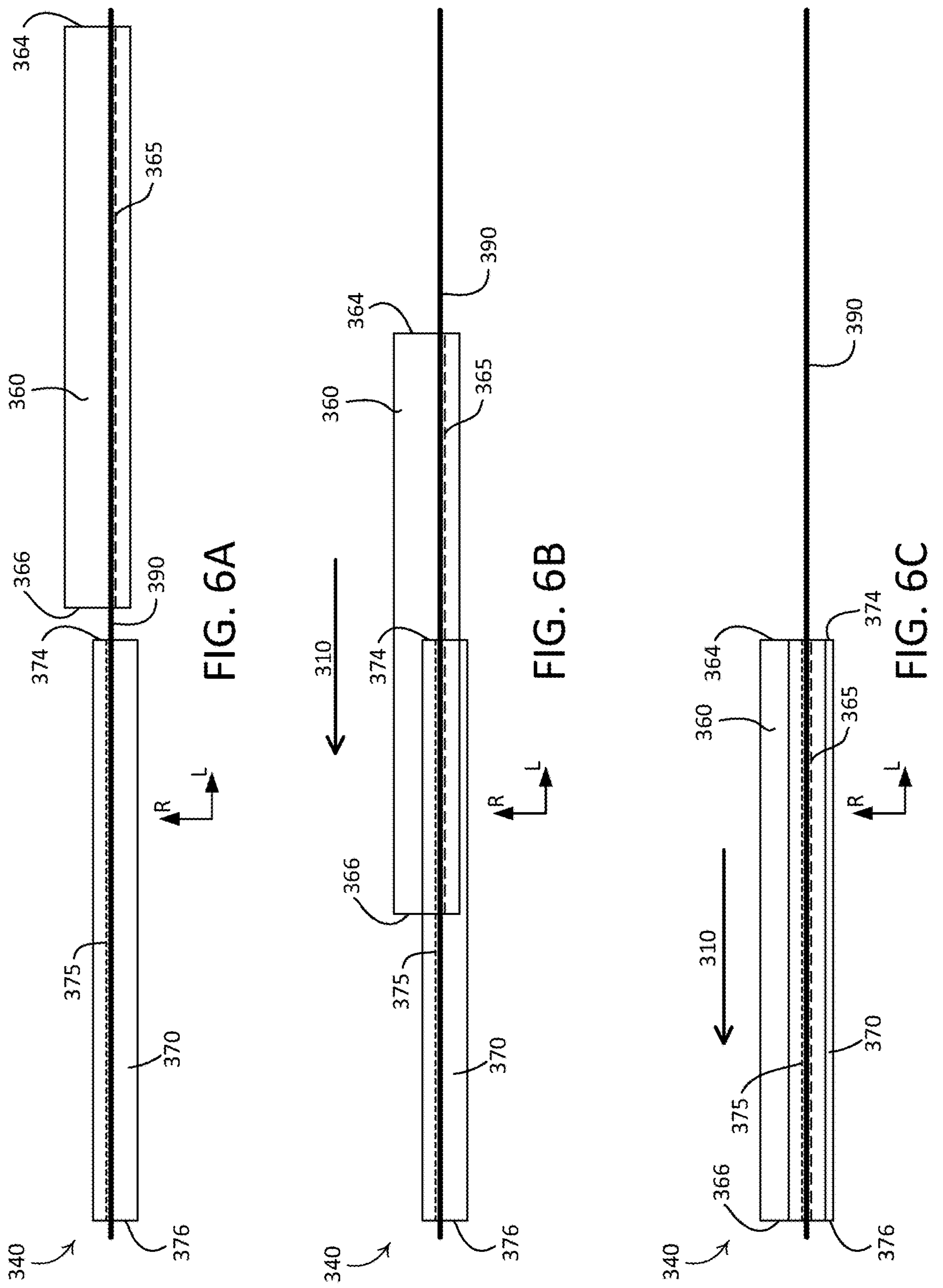
FIG. 6A depicts an example hembar assembly having two portions with a rubber spline stretched and the two portions disengaged.
FIG. 6B depicts an example hembar assembly with the rubber spline stretched and the two portions partially engaged.
FIG. 6C depicts an example hembar assembly with the rubber spline stretched and the two portions fully engaged.

FIGS. 6A-6C depict an example assembly of a hembar 340 having a front portion 360, a rear portion 370, and a compressible member, such as a rubber spline 390. The hembar 340 may be configured as the hembar 140 shown in FIGS. 1-3, 4A, and 4B or as the hembar 240 shown in FIGS. 5A, and 5B. A flexible material (e.g., such as the flexible material 120 shown in FIGS. 1-3, 4A, 4B, 5A, and 5B) may be attached to the hembar 340. The hembar 340 may be an elongated body along the longitudinal direction L. The front portion 360 may be configured as the front portion 160 shown in FIGS. 4A and 4B, the front portion 260 shown in FIGS. 5A and 5B, or a similarly configured portion having a different curved profile. The rear portion 370 may be configured as the rear portion 170 shown in FIGS. 4A and 4B, the rear portion 270 shown in FIGS. 5A and 5B, or similarly configured portion having a different curved profile. The front portion 360 and the rear portion 370 may be configured to slidably engage with one another. The hembar 340 may define a cavity between a first inside surface 365 of the front portion 360 and a second inside surface 375 of the rear portion 370 (e.g., such as the opening 182 shown in FIGS. 4A and 4B or the opening 282 shown in FIGS. 5A and 5B). The front portion 360 may define a first end 364 and a second end 366. The rear portion 370 may define a first end 374 and a second end 376. The rear portion 370 may define a first end 374 and a second end 376.

The front portion 360 may define a first attachment surface (not shown), such as the first attachment surface 162 shown in FIGS. 4A and 4B or the first attachment surface 262 shown in FIGS. 5A and 5B. The rear portion 370 may define a second attachment surface (not shown), such as the second attachment surface 172 shown in FIGS. 4A and 4B or the second attachment surface 272 shown in FIGS. 5A and 5B. The front portion 360 and the rear portion 370 define a slot (e.g., such as the slot 180 shown in FIGS. 4A and 4B or the slot 280 shown in FIGS. 5A and 5B) between the first attachment surface and the second attachment surface configured to receive the flexible material. The flexible material may be secured to the second attachment surface. The flexible material may be secured to the second attachment surface using an adhesive, e.g., double-sided tape. For example, double-sided tape may be applied to the second attachment surface. The flexible material may be pressed against the double-sided tape such that the flexible material is secured to the second attachment surface.

The rubber spline 390 may be elongate along the hembar 340. The rubber spline 390 may have a first diameter when in a relaxed (e.g., not stretched) position. The rubber spline 390 may first be stretched. A tensile force may be applied to opposed ends of the rubber spline 390 such that the rubber spline 390 is stretched from a first length to a second length and a diameter of the rubber spline 390 is reduced to a second diameter. After the rubber spline 390 is stretched, the front and rear portions 360, 370 may be positioned adjacent to the rubber spline such that the front and rear portions do not overlap as shown in FIG. 6A. The front portion 360 may be positioned such that the first inside surface 365 is adjacent the rubber spline 390 and the rear portion 370 may be positioned such that the second inside surface 375 is adjacent the rubber spline 390. The rear portion 370 may be aligned with the front portion 360 such that respective ends thereof are aligned.

As shown in FIG. 6B, the front portion 360 may be slid in a direction 310 into engagement with the rear portion 370. The direction 310 may be in the longitudinal direction L. The front portion 360 may be slid relative to the rear portion 370 since the rear portion is attached to the flexible material.

For example, the front portion 360 may be slid in the direction 310 into engagement with the rear portion 370 from the first end 374 to the second end 376. The front portion 360 may be slid in the direction 310 until the first end 364 of the front portion 360 is substantially aligned with the first end 374 of the rear portion 370 and the second end 366 of the front portion 360 is substantially aligned with the second end 376 of the rear portion 370, as shown in FIG. 6C. As the front portion 360 in the direction 310 into engagement with the rear portion 370, the rubber spline 390 is captured in the cavity that is formed between the first inside surface 365 of the front portion and the second inside surface 375 of the rear portion.

Referring to FIG. 6C, when the front portion 360 is fully engaged with the rear portion 370, the tensile force may be removed from the opposed ends of the rubber spline 390 such that the rubber spline 390 expands within the cavity to a third diameter. The third diameter may be less than the first diameter and greater than the second diameter. The third diameter may vary based on a thickness of the flexible material. The rubber spline 390 may exert a force on the first inside surface 365 of the front portion 360 and the second inside surface 375 of the rear portion 370 such that the flexible material is clamped within the slot. The rear portion 370 may define a groove (e.g., such as the groove 174 shown in FIGS. 4A and 4B or the groove 274 shown in FIGS. 5A and 5B) along the second attachment surface. The front portion 360 may define a rib (e.g., such as the rib 164 shown in FIGS. 4A and 4B or the rib 264 shown in FIGS. 5A and 5B). The rib may be configured to clamp the flexible material within the groove when the tensile force is removed from the opposed ends of the rubber spline 390.

The front portion 360 may define a first flange (e.g., such as the first flange 166 shown in FIGS. 4A and 4B or the first flange 266 shown in FIGS. 5A and 5B) and a first channel (e.g., such as the first channel 168 shown in FIGS. 4A and 4B or the first channel 268 shown in FIGS. 5A and 5B). The rear portion 370 may define a second flange (e.g., such as the second flange 178 shown in FIGS. 4A and 4B or the second flange 278 shown in FIGS. 5A and 5B) and a second channel (e.g., such as the second channel 176 shown in FIGS. 4A and 4B or the second channel 276 shown in FIGS. 5A and 5B). The first flange may be received within the second channel and the second flange may be received within the first channel when the front portion 360 is slid in the direction 310 into engagement with the rear portion 370.

End caps may be added to each end of the hembar 340, for example, when the front portion 360 engages the rear portion 370 and the rubber spline 390 is within the slot.

Figure 7A:
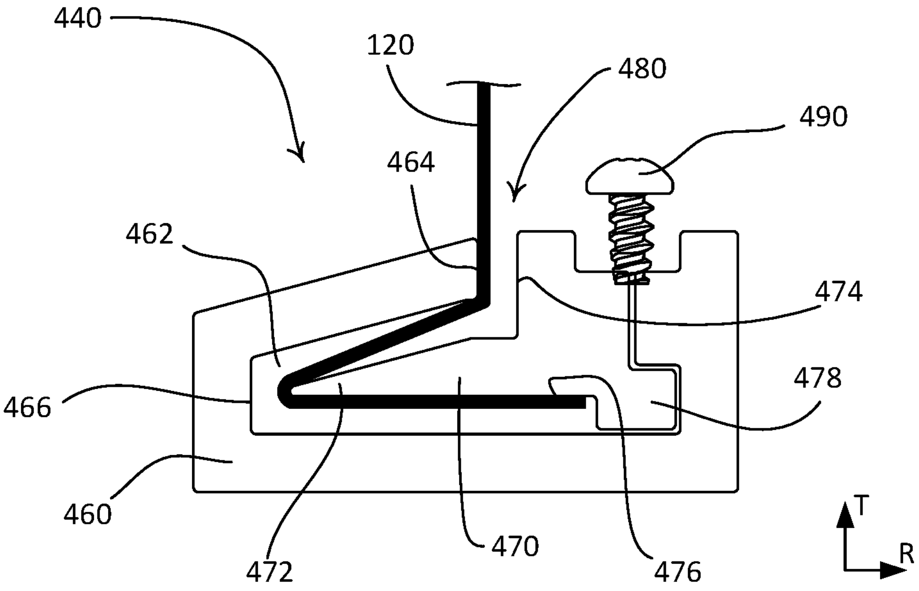
FIGS. 7A and 7B depict side views of another example hembar in an unclamped state and a clamped state, respectively.
Figure 7B:
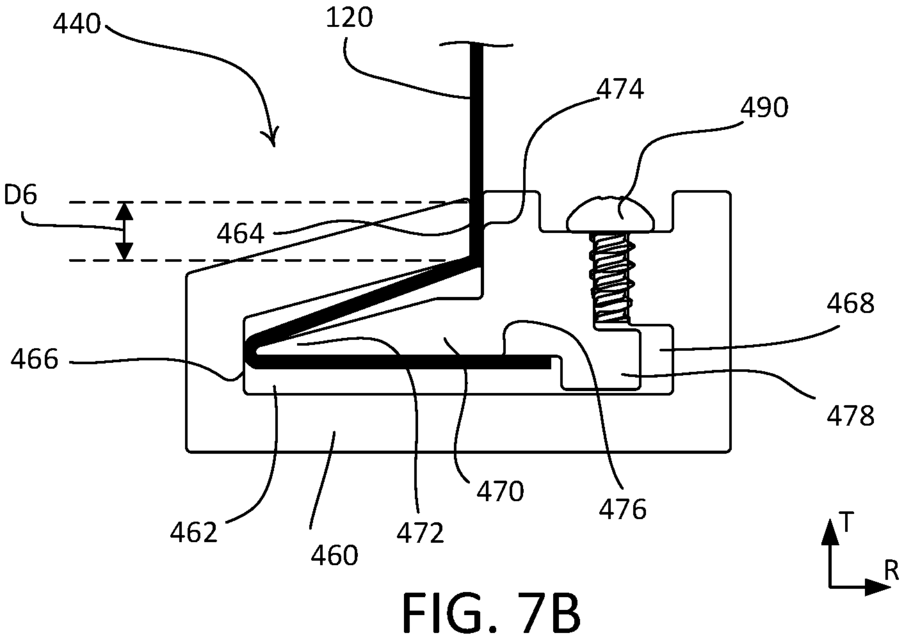

FIGS. 7A and 7B depict side views of another example hembar 440 that may be attached to the flexible material 120 of a window treatment system (e.g., the window treatment system 100), for example, with an end cap of the hembar 440 removed. The hembar 440 may include a body 460 having a recess 462 and a clamping portion 470 having a wedge 472. The clamping portion 470 may be configured to slide through the recess 462 of the body 460. A first surface 464 of the body 460 and a second surface 474 of the clamping portion 470 may define a slot 480 (e.g., a gap). The slot 480 may extend along a length of the hembar 440, for example, in the longitudinal direction L. The slot 480 may be configured to receive the flexible material 120 (e.g., a piece of fabric). The flexible material 120 may wrap around the wedge 472 of the clamping portion 470 and may be attached to a bottom attachment surface 476 of the clamping portion 470, for example, using an adhesive (e.g., double-sided sticky tape).

The body 460 and the clamping portion 470 may be configured to clamp the flexible material 120 within the slot 480. A width of the slot 480 may be adjustable. For example, the width of the slot may be variable (e.g., continuously variable) from a first width to a second width. Referring to FIG. 7A, the slot 480 is shown with a width greater than the width shown in FIG. 7B. The body 460 and the clamping portion 470 may be configured such that the width of the slot 480 is adjustable.

The hembar 440 may include a screw 490 that may be tightened to clamp the flexible material 120 in the hembar 440. When the screw 490 is loosened, the slot 480 may get wider as shown in FIG. 5A. When the screw 490 is tightened, the screw 490 may push the clamping portion 470 towards an inside wall 466 of the recess 462 until the flexible material 120 is clamped between the wedge 472 and the inside wall 466 of the recess 462 as shown in FIG. 5B. The flexible material 120 may also be clamped between the first surface 464 of the body 460 and the second surface 474 of the clamping portion 470. The clamping portion 470 may define a flange 478 that may be received in a channel 468 of the body 460, for example, such that alignment is maintained between the body 460 and the clamping portion 470.

The flexible material 120 may be planar in the slot 480 for at least a distance D6 before the flexible material 120 exits the hembar 440. For example, the flexible material 120 may define a planar section defined by a portion of the flexible material 120 within the slot 480. The planar section of the flexible material 120 along the distance D6 may be aligned with the center of gravity of the hembar 440. The planar section of the flexible material 120 may enable the hembar to hang substantially level in the radial direction R as described herein.

Figure 8:
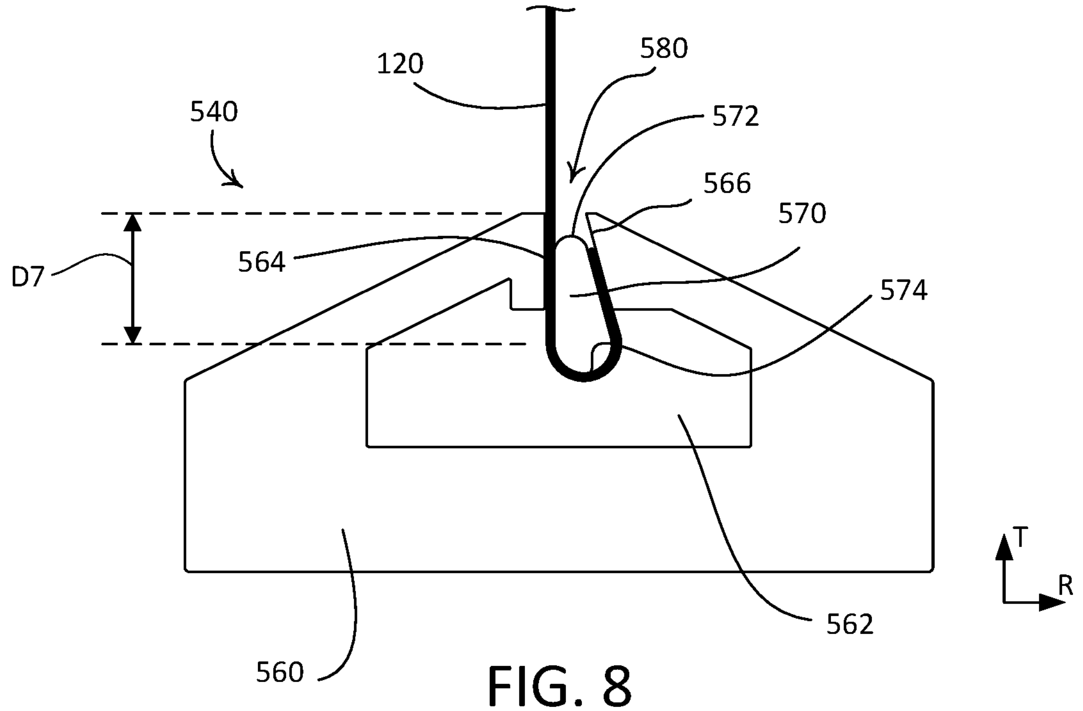
FIGS. 8, 9, and 10 depict side view of more example hembars.

FIG. 8 depicts a side view of another example hembar 540 that may be attached to the flexible material 120 of a window treatment system (e.g., the window treatment system 100), for example, with an end cap of the hembar removed. The hembar 540 may include a body 560 having a recess 562 and a spline 570 that may be located within the recess 562. The recess 562 may define inner surfaces, e.g., a vertical surface 564 and a sloped surface 566. The spline 570 may be wedge-shaped. The vertical surface 564 and the sloped surface 566 may define a slot 580 (e.g., a gap) of the body 560. The slot 580 may extend along a length of the hembar 540, for example, in the longitudinal direction L. The slot 580 may be configured to receive the flexible material 120 (e.g., a piece of fabric). The flexible material 120 (e.g., an end portion of the flexible material) may be wrapped around the spline 570 and may be attached to an outer surface of the spline 570, for example, using an adhesive.

The spline 570 may define a thin end 572 (e.g., an upper end) and a thick end 574 (e.g., a lower end). For example, the thin end 572 may be characterized by a smaller radius than the thick end 574. The spline 570 may be configured to be received in the slot 580 in the body 560. The slot 580 may be characterized by a shape that substantially corresponds to (e.g., matches) the shape of the spline 570. When the spline 570 is received in the slot 580, the body 560 and the spline 570 may be configured to clamp the flexible material 120 within the slot 580, for example, due to the force of gravity on the body 560 of the hembar 540. The body 560 and the spline 570 may accommodate various widths of the flexible material 120.

The flexible material 120 may be planar along the surface of the spline 570 and the body 560 for at least a distance D7 before the flexible material exits the hembar 540. For example, the flexible material 120 may define a planar section defined by a portion of the flexible material 120 within the slot 580. The planar section of the flexible material 120 along the distance D7 may be aligned with the center of gravity of the hembar 540. The planar section of the flexible material 120 may enable the hembar 540 to hang substantially level in the radial direction R as described herein.

Figure 9:
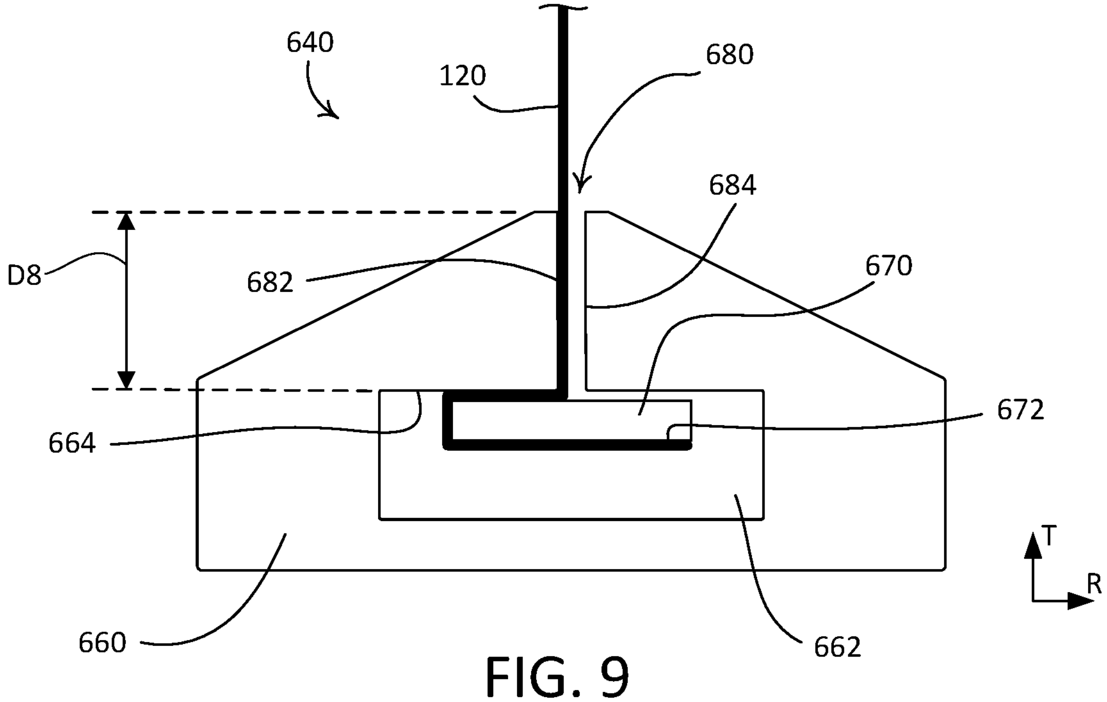

FIG. 9 depicts a side view of another example hembar 640 that may be attached to the flexible material 120 of a window treatment system (e.g., the window treatment system 100), for example, with an end cap of the hembar 640 removed. The hembar 640 may include a body 660 defining a recess 662 and a spline 670 received in the recess 662. The body 660 may define a slot 680 (e.g., a gap) that has first and second surfaces 682, 684. The slot 680 may extend from outside the hembar 640 to the recess 662. The slot 680 may extend along a length of the hembar 640, for example, in the longitudinal direction L.

The slot 680 may be configured to receive the flexible material 120 (e.g., a piece of fabric) without clamping the flexible material in the slot. The flexible material 120 may be wrapped around the spline 670 and may be attached to a bottom surface 672 of the spline, for example, using an adhesive (e.g., double-sided sticky tape). The spline 670 may be trapped (e.g., captured) in the recess 662. The flexible material 120 may exit the hembar 640 through the slot 680. The spline 670 may be configured to clamp the flexible material 120 against an inner surface 664 of the recess 662. The first surface 682 may define a planar vertical surface. The flexible material 120 may be planar along the first surface 682 of the slot 680 for at least a distance D8 after the flexible material exits the recess 662 and before the flexible material exits the hembar 640. For example, the flexible material 120 may define a planar section defined by a portion of the flexible material 120 within the slot 680. The planar section of the flexible material 120 along the distance D8 may be aligned with the center of gravity of the hembar 640. The planer section of the flexible material 120 may enable the hembar 640 to hang substantially level in the radial direction R.

Figure 10:
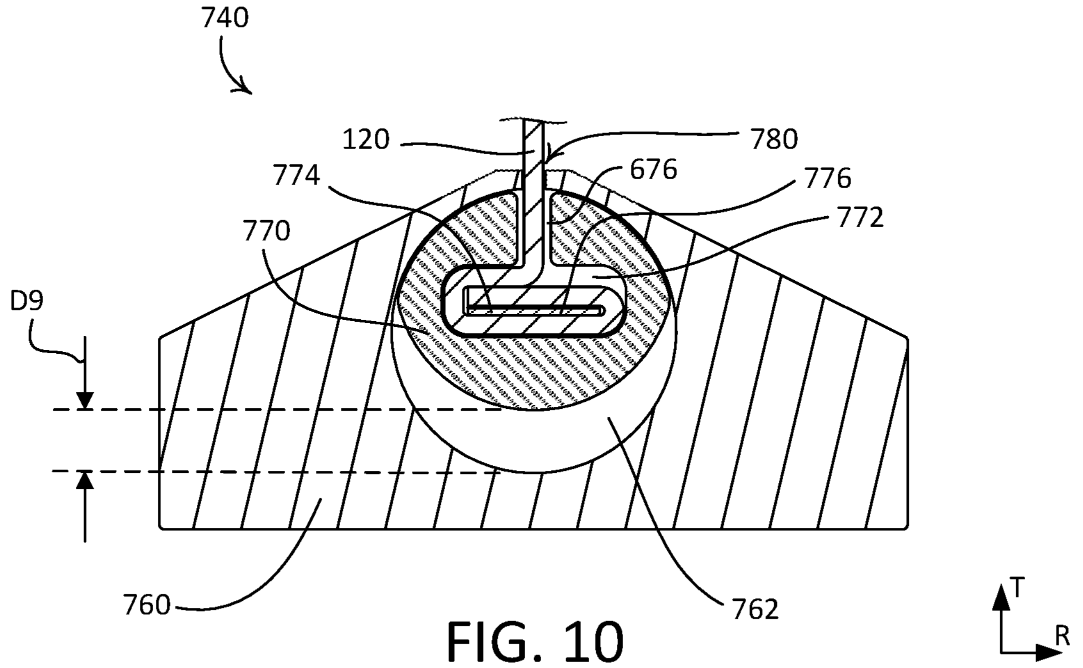

FIG. 10 depicts a side cross-section view of another example hembar 740 that may be attached to the flexible material 120 of a window treatment system (e.g., the window treatment system 100). The hembar 740 may include a body 760 defining a recess 762 that may have a circular cross-section as shown in FIG. 10. The hembar 740 may include an interior member 770 that may be received in the recess 762. The interior member 770 may extend along the length of the hembar 740, for example, in the longitudinal direction L. The interior member 770 may define an elliptical cross-section as shown in FIG. 10. The interior member 770 may include a recess 772 and a spline 774 received in the recess 772. The body 760 may define a slot 780 (e.g., a gap) that may extend from outside the hembar 740 to the recess 762. The interior member 770 may define a slot 782 (e.g., a gap) that may extend from outside the interior member 770 to the recess 772. The slots 780, 782 of each of the body 760 and the interior member 770 may extend along the length of the hembar 740 in the longitudinal direction L.

The flexible material 120 may be wrapped around the spline 774 inside the recess 772 of the interior member 770 and may be attached to a bottom surface 776 of the spline 774, for example, using an adhesive (e.g., double-sided sticky tape). The spline 774 may be trapped (e.g., captured) in the recess 772 of the interior member 770. The flexible material 120 may exit the hembar 740 through the slot 782 of the interior member 770 and the slot 780 of the body 760 (e.g., without clamping the flexible material). The interior member 770 may be rotatably captured within the recess 762 of the body 760. The interior member 770 may rest in an upper portion of the recess 762, for example, due to gravity exerting a force for the body 760. For example, a bottom of the interior member 770 may be a distance D9 from a bottom of the recess as shown in FIG. 10. For example, the distance D9 may range from approximately 0.131 inches to 0.191 inches when the diameter of the recess 762 is approximately 0.625 inches. A weight of the body 760 may be divided substantially equally on either side of the slot 780, and the body 760 may define a center of gravity that is aligned with the slot 780. When the weight of the body 760 is balanced on either side of the slot 680, the body 760 may be configured to rotate about the interior member 770, for example, to allow the body to hang substantially level in the radial direction R.

Figure 11:
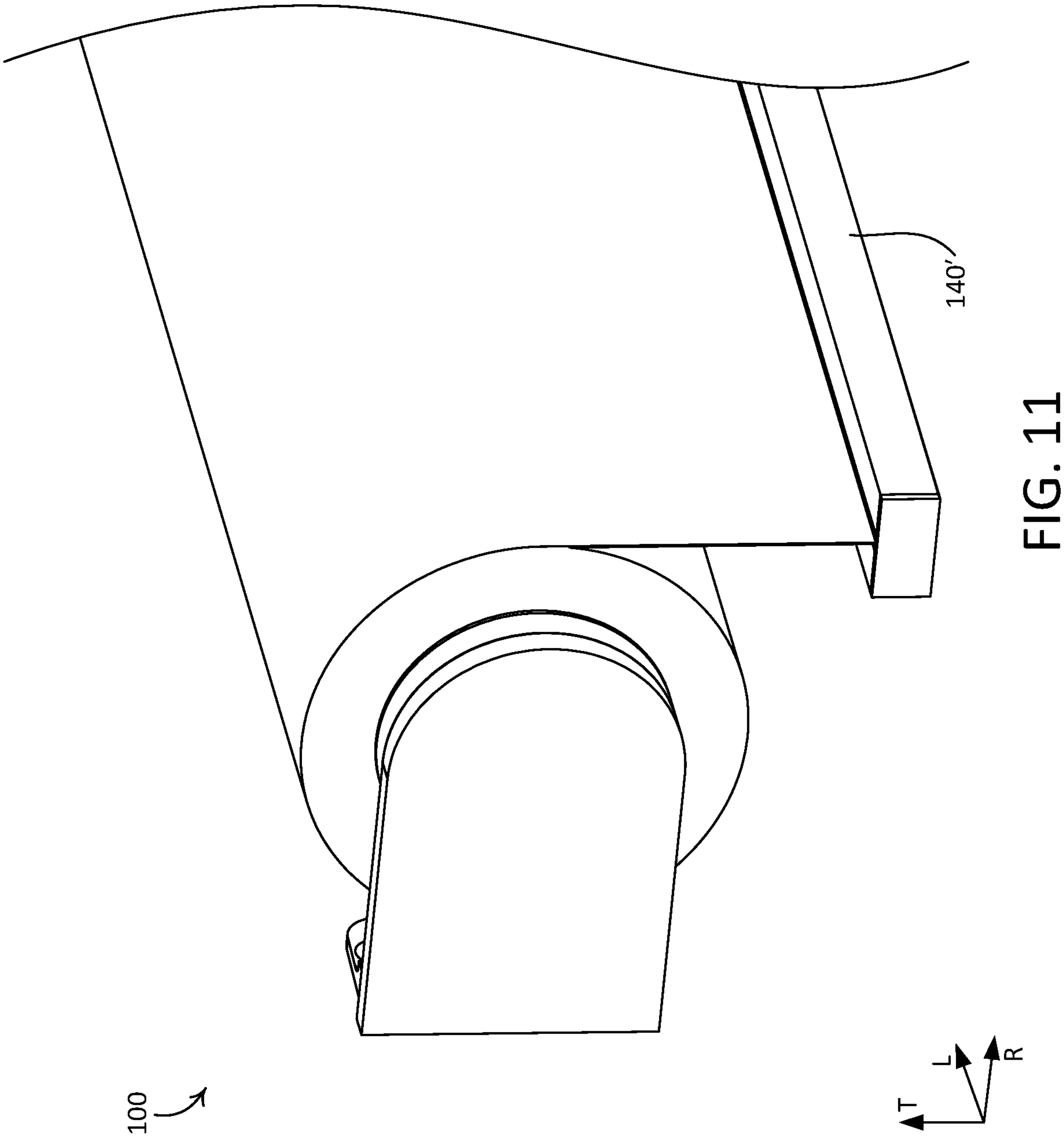
FIG. 11 is an enlarged perspective view of an example window treatment system showing another example hembar.

While the hembars 140, 240, 540, 640, 740 shown and described herein have upper surfaces with sloped profiles and vertical front and rear walls, the hembars may have a side profile of a different shape. For example, the hembars 140, 240, 540, 640, 740 may not include one or more of the shown surfaces (e.g., the top, bottom, front, rear walls and/or the upper surfaces). The side profile of the hembars may be in the shape of a rectangle (e.g., as shown on a hembar 140' in FIG. 11), triangle, circle, oval, or other suitable shape. The surfaces of the hembars 140, 140', 240, 540, 640, 740 (e.g., the top, bottom, front, rear walls and/or the upper surfaces) may be linear, curved (e.g., convex or concave), or of another shape. In addition, the surfaces of the hembars 140, 140', 240, 540, 640, 740 may be characterized by various colors, finishes, designs, patterns, etc.

Figure 12A:
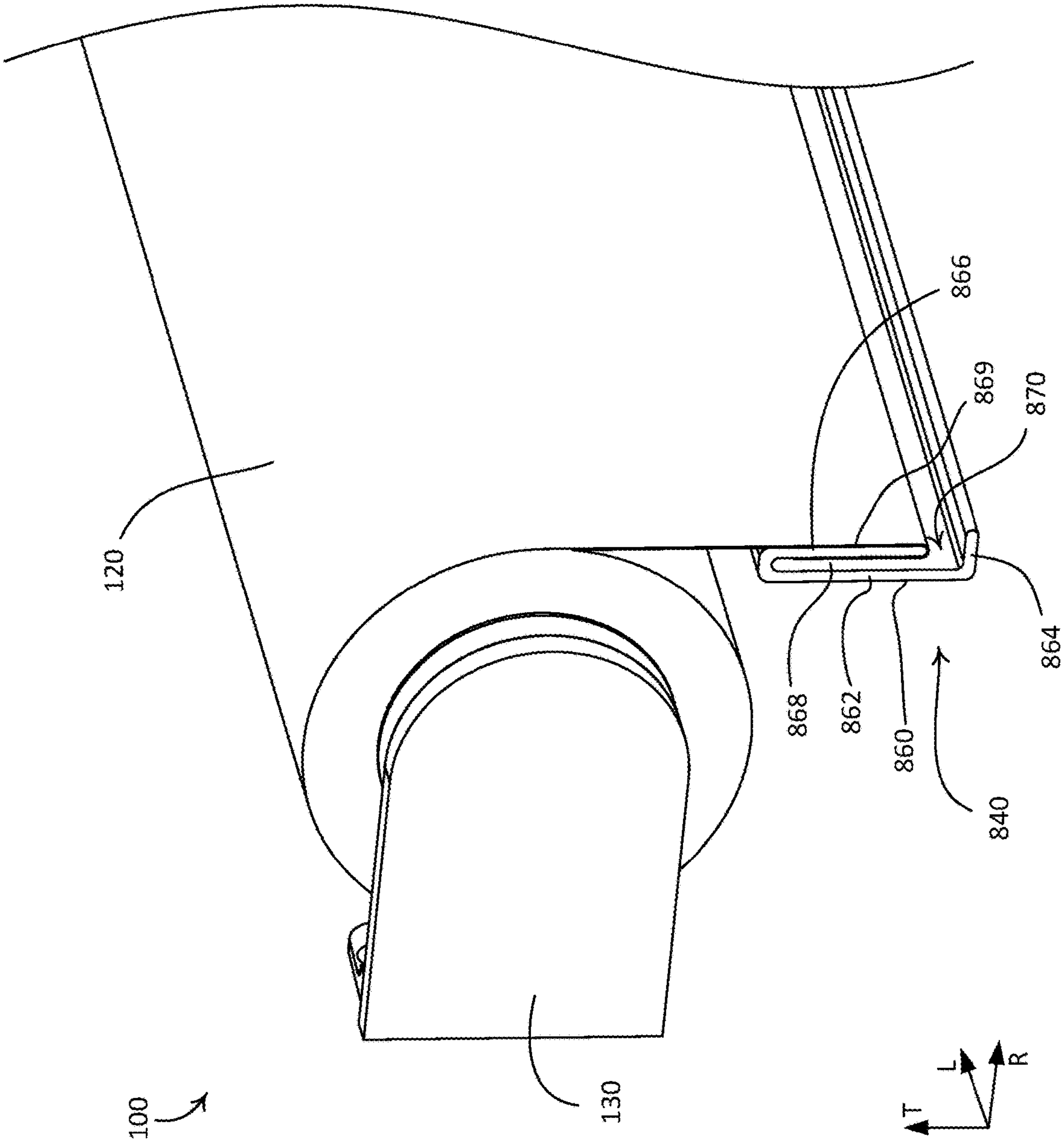
FIG. 12A depicts a perspective view of another example hembar.

FIG. 12A depicts a perspective view of another example hembar 840 that may be attached to the flexible material 120 of the window treatment system 100. The hembar 840 may include a body 860 having a vertical portion 862 connected to a horizontal portion 864 to form an L-shaped profile as shown in FIG. 12A. The body 860 may include a front portion 866 that is arranged vertically. The front portion 866 may be connected to the vertical portion 862 to form a recess 868. The body 860 may define a gap 870 (e.g., a slot) between the front portion 866 and the horizontal portion 864. The flexible material 120 may be attached to a front surface (e.g., a planar vertical surface) of the front portion 866 of the body 860, for example, using an adhesive (e.g., double-sided sticky tape). An end of the flexible material 120 may extend into the recess 868 of the body 860. The hembar 840 may include a spline (not shown) that may be received within the recess 868 of the body 860. The spline may be configured to retain the end of the flexible material 120 within the recess 868. For example, the spline may clamp the flexible material 120 against an inner surface 869 of the recess 868.

Figure 12B:
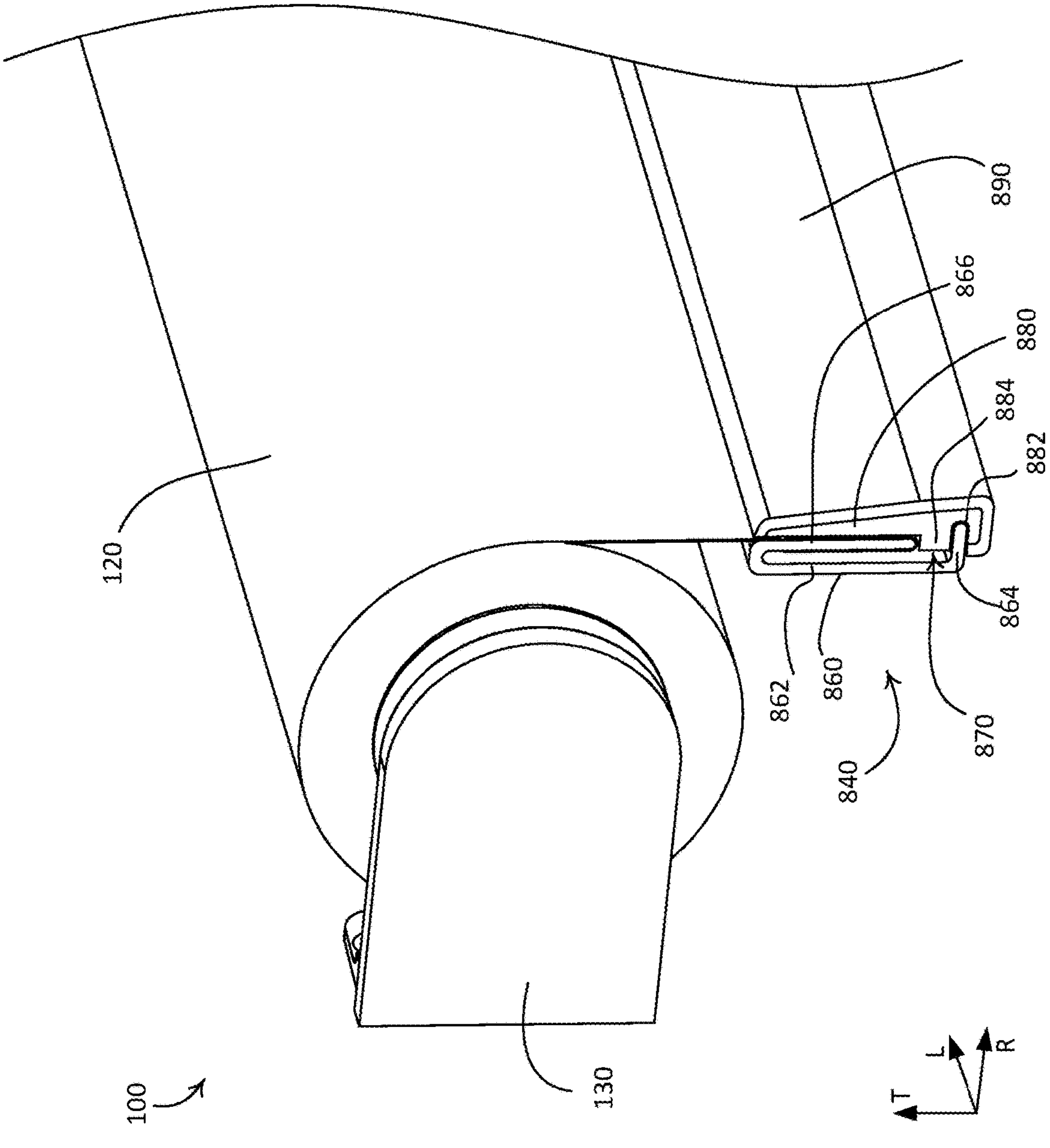
FIG. 12B depicts a perspective view of the hembar of FIG. 12A having an attachment member and a cover attached to the hembar.
Figure 12C:
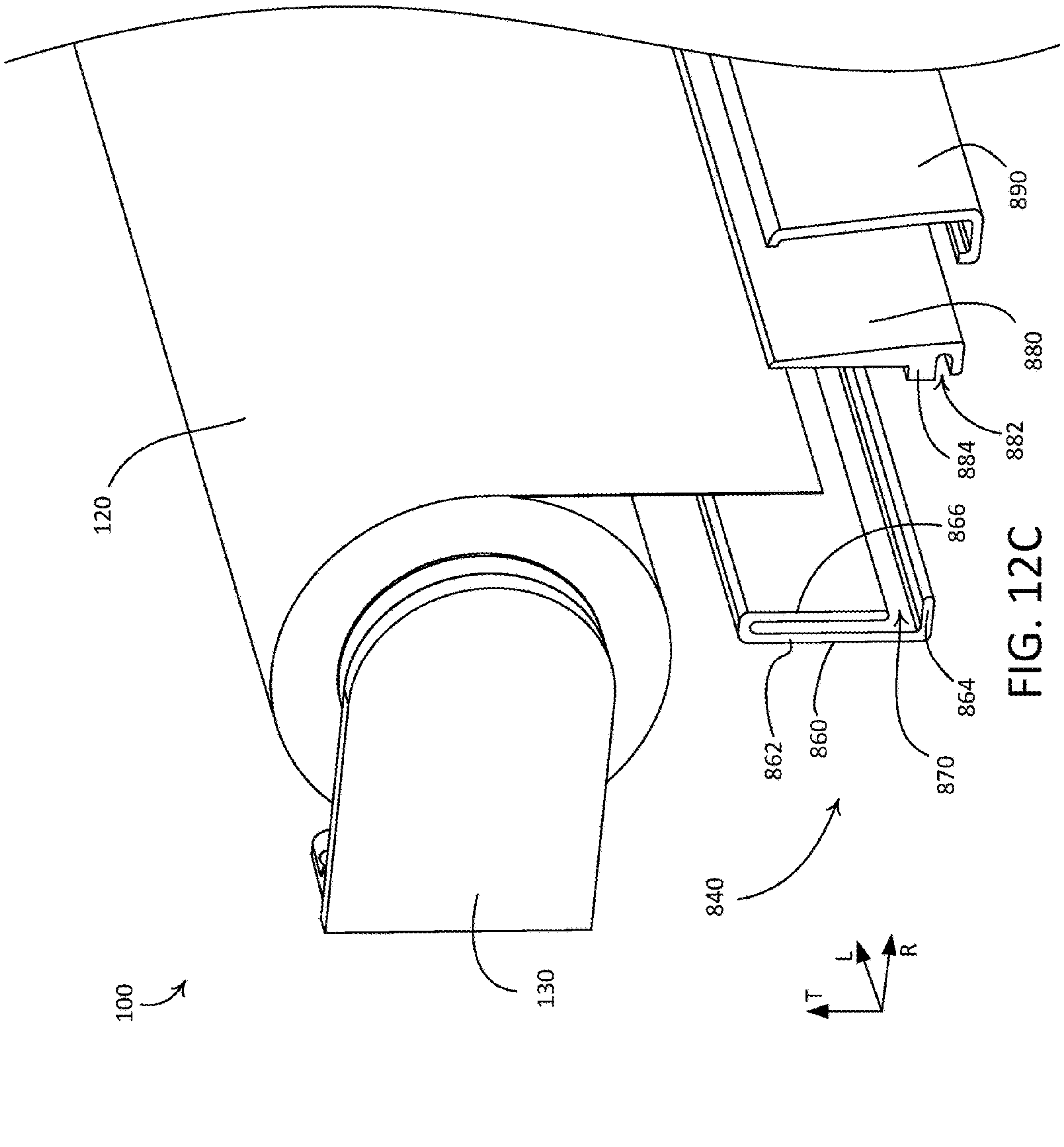
FIG. 12C depicts an exploded perspective view of the hembar of FIG. 12B showing the attachment member and the cover detached from the hembar.

FIG. 12B depicts a perspective view of the hembar 840 having an attachment member 880 and a cover 890 (e.g., a veneer) attached to the hembar 840. FIG. 12C depicts an exploded perspective view of the hembar 840 showing the attachment member 880 and the cover 890 detached from the hembar 840. The attachment member 880 may include a notch 882 configured to receive the horizontal portion 864 of the body 860. The attachment member 880 may include a projection 884 configured to be received in the gap 870 of the body 860, for example, to connect the attachment member 880 to the body 860. The cover 890 may be snapped overtop of the attachment member 880 as shown in FIG. 12B.

The flexible material 120 may be planar along the front portion 866 of the body 860 before the flexible material departs from the hembar 840. For example, the flexible material 120 may define a planar section defined by a portion of the flexible material 120 along the front portion 866. The planar section of the flexible material 120 may enable the hembar 840 to hang substantially level in the radial direction R.

Figure 13:
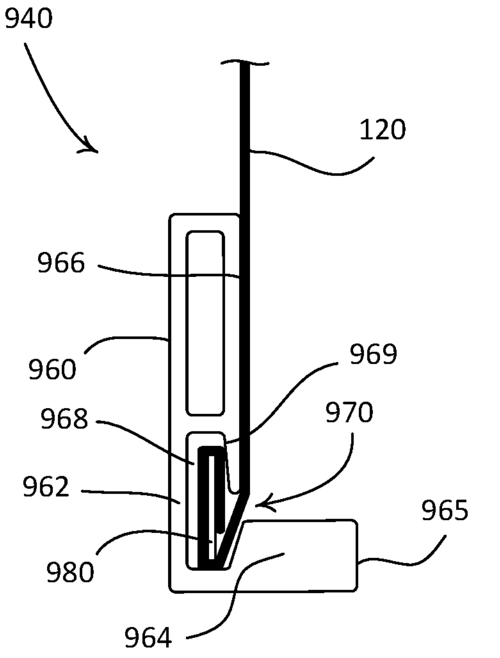
FIGS. 13 and 14 depict side view of more example hembars.

FIG. 13 depicts a side view of another example hembar 940 that may be attached to the flexible material 120 of a window treatment system (e.g., the window treatment system 100). The hembar 940 may include a body 960 having a vertical portion 962 connected to a horizontal portion 964 to form an L-shaped profile. The horizontal portion 964 may define a front edge 965 that may be positioned on the interior side of the window treatment system 100. The body 960 may define a gap 970 (e.g., a slot) between a front surface 966 (e.g., a planar vertical surface) of the vertical portion 962 and the horizontal portion 964. The body 960 may define a recess 968 (e.g., a vertically-oriented recess in the vertical portion 962) to which access is provided through the gap 970. The hembar 940 may include a spline 980 that is received in the recess 968. The flexible material 120 may be attached to the front surface 966 of the vertical portion 962, for example, using an adhesive (e.g., double-sided sticky tape). An end of the flexible material 120 may be wrapped around the spline 980 in the recess 968 and may be attached to the spline 980 (e.g., using an adhesive). The spline 980 may clamp the flexible material 120 against an inner surface 969 of the recess 968.

The flexible material 120 may be planar along the front, surface 966 of the vertical portion 962, which may enable the hembar 940 to hang substantially level in the radial direction R.

Figure 14:
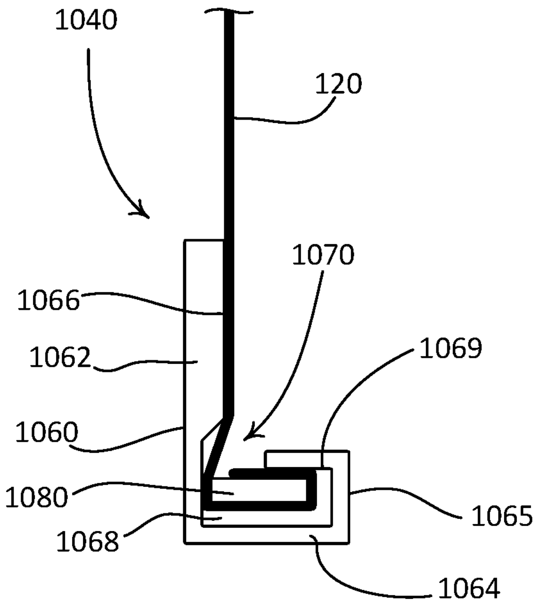

FIG. 14 depicts a side view of another example hembar 1040 that may be attached to the flexible material 120 of a window treatment system (e.g., the window treatment system 100). The hembar 1040 may include a body 1060 having a vertical portion 1062 connected to a horizontal portion 1064 to form an L-shaped profile. The horizontal portion 1064 may define a front edge 1065 that may be positioned on the interior side of the motorized window treatment system. The body 1060 may define a gap 1070 (e.g., a slot) between a front surface 1066 (e.g., a planar Vertical surface) of the vertical portion 1062 and the horizontal portion 1064. The body 1060 may define a recess 1068 (e.g., a horizontally-oriented recess in the horizontal portion 1064) to which access is provided through the gap 1070. The hembar 1040 may include a spline 1080 that is received in the recess 1068. The flexible material 120 may be attached to the front surface 1066 of the vertical portion 1062, for example, using an adhesive (e.g., double-sided sticky tape). An end of the flexible material 120 may be wrapped around the spline 1080 in the recess 1068 and may be attached to the spline 1080 (e.g., using an adhesive). The spline 1080 may clamp the flexible material 120 against an inner surface 1069 of the recess 1068.

The flexible material 120 may be planar along the front surface 1066 of the vertical portion 1062, which for example may enable the hembar 1040 to hang substantially level in the radial direction R.

While the hembars shown and described herein are described with respect to a window treatment system, the hembars may be applied to any hanging material (e.g., whether or not retractable) such as a material to cover an opening such as a door, a projection screen, artistic tapestries that may be placed on wall, etc.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A hembar comprising:

a first portion that is elongate in a longitudinal direction, the first portion defining a first inside surface;

a second portion that is elongate in the longitudinal direction, the second portion configured to slidably engage the first portion, the second portion defining a second inside surface, wherein the first portion and the second portion define a slot configured to receive a piece of fabric and an internal cavity that extends in the longitudinal direction; and a compressible member configured to transition from a relaxed position to a stretched position by stretching the compressible member in the longitudinal direction, the compressible member configured to be enclosed within the internal cavity such that the compressible member is surrounded by the first inside surface of the portion, the second inside surface of the second portion, and two other surfaces that define the internal cavity, the compressible member having a first diameter in the relaxed position and a second diameter in the stretched position, wherein the first diameter is greater than the second diameter, and wherein the compressible member is configured to, when released from the stretched position within the internal cavity, exert a force on the first inside surface of the first portion and the second inside surface of the second portion such that the piece of fabric is clamped within the slot.

2. The hembar of claim 1, wherein the first portion and the second portion are configured such that a width of the slot is adjustable.

3. The hembar of claim 1, wherein a width of the slot is continuously variable from a first width to a second width.

4. The hembar of claim 1, wherein the piece of fabric is attached to the first portion or the second portion within the slot using double-sided tape.

5. The hembar of claim 1, wherein the first portion defines a first attachment surface and the second portion defines a second attachment surface, and wherein the first attachment surface is configured to press against the second attachment surface when the first portion is slidably engaged with the second portion.

6. The hembar of claim 5, wherein the internal cavity of the hembar is defined by the first portion and the second portion, and wherein the compressible member exerts the force on the first portion and the second portion such that the piece of fabric is clamped between the first attachment surface and the second attachment surface.

7. The hembar of claim 6, wherein the compressible member is a hollow rubber spline.

8. The hembar of claim 5, wherein the first attachment surface defines a rib and the second attachment surface defines a groove configured to receive the rib when the first portion is slidably engaged with the second portion, and wherein the rib and groove are configured to clamp the piece of fabric within the slot.

9. The hembar of claim 1, wherein the internal cavity is accessible at opposed ends of the hembar.

10. The hembar of claim 1, wherein the first portion defines a first flange and a first channel, and wherein the second portion defines a second flange and a second channel, and wherein the first flange is received within the second channel and the second flange is received within the first channel such that alignment is maintained between the first portion and the second portion.

11. The hembar of claim 1, wherein the first portion and the second portion are configured to be locked together.

12. A hembar comprising:

a front wall defining a substantially vertical front surface;

a rear wall defining a substantially vertical rear surface, the front wall and the rear wall spaced from each other by a horizontal distance;

a bottom wall defining a substantially horizontal bottom surface;

a first interior wall that is parallel to the front wall, the first interior wall defining a substantially vertical first inside surface;

a second interior wall that is parallel to the rear wall, the second interior wall defining a substantially vertical second inside surface that is parallel to the rear wall;

a slot located between the front wall and the rear wall, the slot configured to receive a flexible material;

an internal cavity between the front wall and rear wall that extends in a longitudinal direction; and a rubber spline configured to transition from a relaxed position to a stretched position when stretched in the longitudinal direction, the rubber spline enclosed within the internal cavity such that the rubber spline is surrounded by the substantially vertical first inside surface, the substantially vertical second inside surface, and two other surfaces that define the internal cavity, the rubber spline having a first diameter in a relaxed position and a second diameter in a stretched position, wherein the first diameter is greater than the second diameter, and wherein the rubber spline is configured to, when released from the stretched position within the internal cavity, exert a force on the substantially vertical first inside surface and the substantially vertical second inside surface such that the flexible material is clamped within the slot, and wherein the hembar comprises two or more pieces that slidably attach to one another.

13. The hembar of claim 12, wherein a first piece of the two or more pieces comprises the front wall and the first interior wall, and wherein a second piece of the two or more pieces comprises the rear wall and the second interior wall.

14. The hembar of claim 13, wherein the internal cavity is defined by the first piece and the second piece.

15. The hembar of claim 14, wherein the hembar defines a center of gravity that is aligned with the slot.

16. The hembar of claim 12, wherein the slot extends along a length of the hembar in the longitudinal direction.

17. The hembar of claim 12, wherein the slot is located at a midpoint between the front wall and the rear wall.

18. The hembar of claim 17, wherein a weight of the hembar is divided substantially equally on either side of the slot.

19. The hembar of claim 12, wherein a depth of the hembar is at least two times a height of the hembar.

20. The hembar of claim 12, wherein the internal cavity is accessible at opposed ends of the hembar.

21. The hembar of claim 20, further comprising end caps configured to cover the opposed ends of the hembar.

* * * * *